United States Patent
Seki et al.

(10) Patent No.: US 11,327,206 B2
(45) Date of Patent: May 10, 2022

(54) DIFFUSER

(71) Applicant: NALUX CO., LTD., Osaka (JP)

(72) Inventors: Daisuke Seki, Osaka (JP); Yukinobu Nishio, Osaka (JP); Toru Inomata, Osaka (JP); Masato Okano, Osaka (JP)

(73) Assignee: NALUX CO., LTD., Osaka (JP)

( * ) Notice: Subject to any disclaimer, the term of this patent is extended or adjusted under 35 U.S.C. 154(b) by 262 days.

(21) Appl. No.: 16/531,214

(22) Filed: Aug. 5, 2019

(65) Prior Publication Data

US 2019/0353831 A1    Nov. 21, 2019

Related U.S. Application Data

(63) Continuation-in-part of application No. PCT/JP2018/004889, filed on Feb. 13, 2018.

(Continued)

(51) Int. Cl.
*G02B 5/02*    (2006.01)
*G02B 27/00*    (2006.01)

(52) U.S. Cl.
CPC ....... *G02B 5/0278* (2013.01); *G02B 27/0012* (2013.01)

(58) Field of Classification Search
CPC .......................... G02B 5/0278; G02B 27/0012
(Continued)

(56) References Cited

U.S. PATENT DOCUMENTS 6,352,359 B1    3/2002  Shie et al.
7,955,531 B1 *  6/2011  Khanarian ........... G02B 6/0036
                                                        264/1.7

(Continued)

FOREIGN PATENT DOCUMENTS

JP    2008-3234 A        1/2008
JP    2008003234 A  *   1/2008   ........... G02B 5/0278

(Continued)

OTHER PUBLICATIONS

International Search Report and Written Opinion dated Apr. 24, 2018 corresponding to International Patent Application No. PCT/JP2018/004889, and partial English translation thereof.

(Continued)

*Primary Examiner* — Collin X Beatty
(74) *Attorney, Agent, or Firm* — Squire Patton Boggs (US) LLP

(57) ABSTRACT

A diffuser provided with plural shapes obtained by translation on an xy plane of at least one of $z=g(x, y)$ and $z=-g(x, y)$, $z=g(x, y)$ being a smooth function within a rectangle having sides of length of s in x direction and sides of length of t in y direction, the origin being the center of the rectangle, wherein on the sides of the rectangle, $$g(x, y) = 0,$$

$$\frac{\partial g(x, y)}{\partial x} = 0,$$

$$\frac{\partial g(x, y)}{\partial y} = 0,$$

$$\frac{\partial^2 g(x, y)}{\partial x^2} = 0, \text{ and}$$

$$\frac{\partial^2 g(x, y)}{\partial y^2} = 0,$$

and wherein $z=g(x, y)$ has a single vertex at $(x_v, y_v)$ $g(x,y)=h_1(x) \cdot h_2(y),$ first derivative of $z=h_1(x)$ (Continued)

is continuous in $$\left(-\frac{s}{2}, \frac{s}{2}\right),$$

second derivative of $z = h_1(x)$ has a single point of discontinuity in $$\left(-\frac{s}{2}, x_v\right)$$

and $$\left(x_v, \frac{s}{2}\right),$$

first derivative of $z = h_2(y)$ is continuous in $$\left(-\frac{t}{2}, \frac{t}{2}\right),$$

and second derivative of $z = h_2(y)$ has a single point of discontinuity in $$\left(-\frac{t}{2}, y_v\right)$$

and $$\left(y_v, \frac{t}{2}\right).$$

11 Claims, 25 Drawing Sheets

Related U.S. Application Data

(60) Provisional application No. 62/459,257, filed on Feb. 15, 2017.

(58) Field of Classification Search
USPC .......................................................... 359/599
See application file for complete search history.

(56) References Cited

U.S. PATENT DOCUMENTS

| | | | |
|---|---|---|---|
| 2008/0296573 A1* | 12/2008 | Suehiro | H01L 33/387 257/53 |
| 2009/0169820 A1 | 7/2009 | Koike et al. | |
| 2009/0268428 A1* | 10/2009 | Tsukada | G02B 5/0278 362/97.1 |
| 2010/0230839 A1* | 9/2010 | Etori | G02B 5/0278 264/2.5 |
| 2011/0051249 A1* | 3/2011 | Endoh | G02B 1/118 359/599 |
| 2012/0176772 A1* | 7/2012 | Maekawa | G02B 5/0231 362/97.1 |
| 2015/0301257 A1* | 10/2015 | Choi | F21V 3/049 362/607 |
| 2016/0313474 A1* | 10/2016 | Wada | B29C 59/022 |
| 2017/0031156 A1* | 2/2017 | Uchida | G02B 27/0012 |
| 2017/0139082 A1* | 5/2017 | Takai | G02B 1/113 |
| 2017/0235028 A1* | 8/2017 | Uchida | G02B 27/48 359/599 |
| 2018/0106930 A1* | 4/2018 | Uchida | G02B 27/01 |
| 2020/0150438 A1* | 5/2020 | Geng | G02B 6/0005 |

FOREIGN PATENT DOCUMENTS

| | | |
|---|---|---|
| JP | 2012-051175 A | 3/2012 |
| WO | WO 00/10835 A1 | 3/2000 |
| WO | WO 2007/116671 A1 | 10/2007 |
| WO | WO 2007/148815 A1 | 12/2007 |

OTHER PUBLICATIONS

Office Action dated Dec. 4, 2018 corresponding to Japanese Patent Application No. 2018-532331.

\* cited by examiner

DIFFUSER

CROSS REFERENCE TO RELATED APPLICATION

This is a Continuation-in-Part of International Patent Application No. PCT/JP2018/004889 filed Feb. 13, 2018, which designates the U.S., and which claims priority from U.S. Provisional Patent Application No. 62/459,257, filed on Feb. 15, 2017. The contents of these applications are hereby incorporated by reference.

TECHNICAL FIELD

The present invention relates to a diffuser that diffuses light emitted by a light source.

BACKGROUND ART

Diffusers that diffuse light emitted by a light source have been used in various fields of applications (U.S. Pat. No. 6,352,359B1 for example).

Diffusers in which a plurality of identical shapes are combined such as microlens arrays are used. In such diffusers, when the whole shape of a diffuser is not smooth, a mold for the diffuser is difficult to machine, for example. Thus, the whole shape of a diffuser should preferably be smooth.

It is preferable that intensity of light diffused by a diffuser is greater than a predetermined value and uniform if the absolute value of angle of diffusion in a predetermined direction is equal to or less than the maximum value of the absolute value of angle of diffusion, and the intensity is zero if the absolute value of angle of diffusion in the predetermined direction is greater than the maximum value.

When convex or concave shapes that are identical with one another are arranged at regular intervals, rays that have passed through the diffuser interfere with one another and generate diffraction so that intensity on an illuminated surface is not uniform disadvantageously. A possible solution is that convex or concave shapes themselves or positions of the convex or concave shapes are irregularly changed. Such a solution, however, makes the design and the manufacturing process complicated.

Thus, a diffuser which is capable of making intensity of light diffused by the diffuser greater than a predetermined value and uniform if the absolute value of angle of diffusion in a predetermined direction is equal to or less than the maximum value of the absolute value of angle of diffusion and of making the intensity zero if the absolute value of angle of diffusion in the predetermined direction is greater than the maximum value, the whole shape of which is smooth, and the design and the manufacturing process of which are simple has not been developed.

Accordingly, there is a need for a diffuser which is capable of making intensity of light diffused by the diffuser greater than a predetermined value and uniform if the absolute value of angle of diffusion in a predetermined direction is equal to or less than the maximum value of the absolute value of angle of diffusion and of making the intensity zero if the absolute value of angle of diffusion in the predetermined direction is greater than the maximum value, the whole shape of which is smooth, and the design and the manufacturing process of which are simple. The object of the invention is to provide a diffuser which is capable of making intensity of light diffused by the diffuser greater than a predetermined value and uniform if the absolute value of angle of diffusion in a predetermined direction is equal to or less than the maximum value of the absolute value of angle of diffusion and of making the intensity zero if the absolute value of angle of diffusion in the predetermined direction is greater than the maximum value, the whole shape of which is smooth, and the design and the manufacturing process of which are simple.

SUMMARY OF INVENTION

A diffuser according to an embodiment of the present invention is a diffuser provided with plural shapes obtained by translation on an xy plane of at least one of $z=g(x, y)$ and $z=-g(x, y)$, $z=g(x, y)$ being a smooth function within a rectangle on the xy plane, the rectangle having sides in the x axis direction length of which is s and sides in the y axis direction length of which is t, the origin of the xy coordinates being the center of the rectangle, wherein on the sides of the rectangle, $$g(x, y) = 0,$$

$$\frac{\partial g(x, y)}{\partial x} = 0,$$

$$\frac{\partial g(x, y)}{\partial y} = 0,$$

$$\frac{\partial^2 (x, y)}{\partial x^2} = 0, \text{ and}$$

$$\frac{\partial^2 g(x, y)}{\partial y^2} = 0,$$

and wherein the shape represented by $z=g(x, y)$ has a single vertex at $$(x_v, y_v)$$

in the rectangle, z monotonously increases from a point on a side of the rectangle to the vertex along a straight line connecting the point and the vertex, $g(x, y)$ is represented by $$g(x,y)=h_1(x) \cdot h_2(y),$$

first derivative of $$z=h_1(x)$$

is continuous in the range of x $$\left(-\frac{s}{2}, \frac{s}{2}\right),$$

second derivative of $$z=h_1(x)$$

has a single point of discontinuity in each of the ranges of x $$\left(-\frac{s}{2}, x_v\right)$$

and $$\left(x_v, \frac{s}{2}\right),$$

first derivative of $$z=h_2(y)$$

is continuous in the range of x $$\left(-\frac{t}{2}, \frac{t}{2}\right),$$

and second derivative of $$z=h_2(y)$$

has a single point of discontinuity in each of the range of x $$\left(-\frac{t}{2}, y_v\right)$$

and the range of y $$\left(y_v, \frac{t}{2}\right).$$

The diffuser according to the present embodiment has a characteristic shape represented by $$g(x,y)=h_1(x)\cdot h_2(y),$$

and is capable of making intensity of light diffused by the diffuser greater than a predetermined value and substantially uniform if the absolute value of angle of diffusion in a predetermined direction is equal to or less than the maximum value of the absolute value of angle of diffusion and of making the intensity zero if the absolute value of angle of diffusion in the predetermined direction is greater than the maximum value, the whole shape of which is smooth, and the design and the manufacturing process of which are simple.

In a diffuser according to another embodiment, the shape is represented by $$z = f(x, y) = \sum_{m,n} g(x - ms, y - nt)$$

where m is a number representing a position of each rectangle in the x axis direction, n is a number representing a position of each rectangle in the y axis direction, and the origin is the center of the rectangle numbered with m=0 and n=0.

In a diffuser according to another embodiment, the shape is represented by $$z = f(x, y) = \sum_{m,n} g(x - ms, y - nt) - g\left(x - \frac{2m+1}{2}s, y - \frac{2n+1}{2}t\right)$$

where m is a number representing a position of each rectangle in the x axis direction, n is a number representing a position of each rectangle in the y axis direction, and the origin is the center of the rectangle numbered with m=0 and n=0.

In a diffuser according to another embodiment, $$h_1(x)$$

is a polynomial of second or more degree represented by $$h_1(x) = \begin{cases} 0, & x \notin \left(-\frac{s}{2}, \frac{s}{2}\right) \\ \sum_{i=1}^{N} A_i\left(x + \frac{s}{2}\right)^i, & x \in \left(-\frac{s}{2}, -\frac{s}{4}\right) \\ \sum_{i=1}^{N} A_i\left(-(-1)^i x^i + 2\left(\frac{s}{4}\right)^i\right), & x \in \left[-\frac{s}{4}, 0\right] \\ \sum_{i=1}^{N} A_i\left(-x^i + 2\left(\frac{s}{4}\right)^i\right), & x \in \left(0, \frac{s}{4}\right] \\ \sum_{i=1}^{N} A_i(-1)^i\left(x - \frac{s}{2}\right)^i, & x \in \left(\frac{s}{4}, \frac{s}{2}\right) \end{cases}$$, and $$h_2(y)$$

is a polynomial of second or more degree represented by $$h_2(y) = \begin{cases} 0, & y \notin \left(-\frac{t}{2}, \frac{t}{2}\right) \\ \sum_{j=1}^{M} B_j\left(y + \frac{t}{2}\right)^j, & y \in \left(-\frac{t}{2}, -\frac{t}{4}\right) \\ \sum_{j=1}^{M} B_j\left(-(-1)^j y^j + 2\left(\frac{t}{4}\right)^j\right), & y \in \left[-\frac{t}{4}, 0\right] \\ \sum_{j=1}^{M} B_j\left(-y^j + 2\left(\frac{t}{4}\right)^j\right), & y \in \left(0, \frac{t}{4}\right] \\ \sum_{j=1}^{M} B_j(-1)^j\left(y - \frac{t}{2}\right)^j, & y \in \left(\frac{t}{4}, \frac{t}{2}\right) \end{cases}$$

where i and j represent natural numbers, N and M represents natural numbers that are 2 or more, and Ai and Bj represent constants.

In a diffuser according to another embodiment, $$h_1(x)$$

and $$h_2(y)$$

are even degree polynomials.

In a diffuser according to another embodiment, the ratio of the flat area on the xy plane to the projected area onto the xy plane is less than 1.0%.

In a diffuser according to another embodiment, each vertex of each rectangle is moved at random in a predetermined area around the each vertex on the xy plane such that a convex tetragon is formed by moved vertexes, and a shape of the diffuser represented by z=f(x,y) is determined such that z at a first point in the convex tetragon has a value of z=f(x, y) at a second point in the original rectangle, the second point corresponding to the first point.

The diffuser according to the present embodiment is capable of making a distribution of illuminance on an illuminated surface more uniform without generating diffraction due to a periodic structure.

In a diffuser according to another embodiment, a z coordinate in each rectangle is determined such that the z coordinate is γ times as great as the value of z=f(x, y) in the each rectangle, γ varying at random in the range from 0.9 to 1.1 from a rectangle to another.

The diffuser according to the present embodiment is capable of making a distribution of illuminance on an illuminated surface more uniform without generating diffraction due to a periodic structure.

A diffuser according to another embodiment has shapes on a curved surface, the shapes being configured by a projection of the shapes on the xy plane of the diffuser described above, the projection projecting the xy plane onto the curved surface.

DESCRIPTION OF EMBODIMENTS

Figure 1:
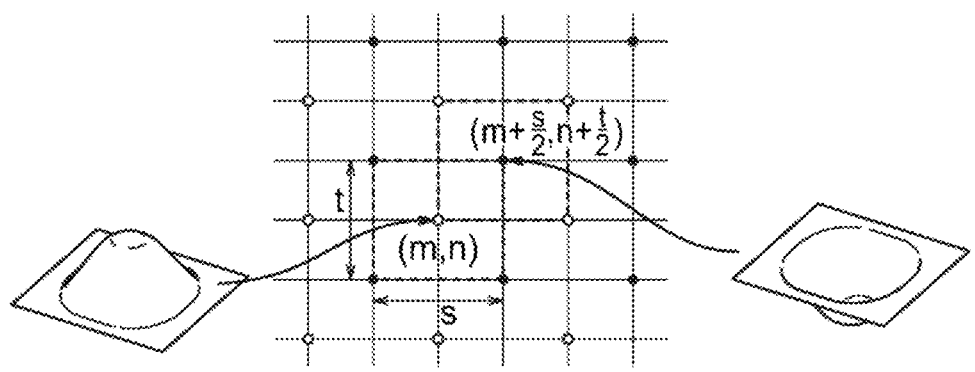
FIG. 1 illustrates the shape of a diffuser according to an embodiment of the present invention.

FIG. 1 illustrates the shape of a diffuser according to an embodiment of the present invention. On an (x, y) plane, a rectangular lattice is determined. The interval in the x direction is s and the interval in the y direction is t. One of the rectangles which have sides length of which in the x direction is s and sides length of which in the y direction is t is selected as a reference rectangle. Positions in the x direction of the rectangles are represented by number m, and positions in they direction of the rectangles are represented by number n. For the reference rectangle, m=0 and n=0. The shape in the reference rectangle is represented by g(x, y). The origin of (x, y) coordinate is determined at the center of the reference rectangle. When S represents an area within the reference rectangle and $$\partial s$$

represents the boundary of the area, that is, the sides of the reference rectangle, the following relationships hold.

When $(x, y) \notin S$, $g(x, y) = 0$.

When $(x, y) \in \partial S$, $g(x, y) = 0$, $\dfrac{\partial g(x, y)}{\partial x} = 0$, $\dfrac{\partial g(x, y)}{\partial y} = 0$, $\dfrac{\partial^2 g(x, y)}{\partial x^2} = 0$, and $\dfrac{\partial^2 g(x, y)}{\partial y^2} = 0$.

g(x, y) is a smooth function in the whole area. It is preferable that the function is symmetric with respect to the x axis and with respect to the y axis, the function has a single extreme value, and the (x, y) coordinates of the extreme value agree with the (x, y) coordinates of the center of the area.

When the whole shape of the diffuser is represented by z=f(x, y), z=f(x, y) is represented by the following expression.

$$z = f(x, y) = g(x - ms, y - nt) - g\left(x - \dfrac{2m+1}{2}s, y - \dfrac{2n+1}{2}t\right)$$

The whole shape is a combination of shapes $g(x-ms, y-nt)$ that are identical with the shape of function g(x, y) and arranged at the centers of respective rectangles in the rectangular lattice and shapes $$-g\left(x - \dfrac{2m+1}{2}s, y - \dfrac{2n+1}{2}t\right)$$

that are identical with the shape of the function –g(x, y) and arranged at respective lattice points. The reason why a combination of shapes that are identical with the shape of g(x, y) and shapes that are identical with the shape of the function –g(x, y) is employed is to make intensity of the diffused light on an illuminated surface more uniform by increasing the area having shapes that make angle of diffusion relatively great. The whole shape of z=f(x, y) is smooth.

If the whole shape of a diffuser is smooth, a mold for the diffuser can more easily be machined.

As g(x, y), such a function as shown below can be employed.

Figure 2:
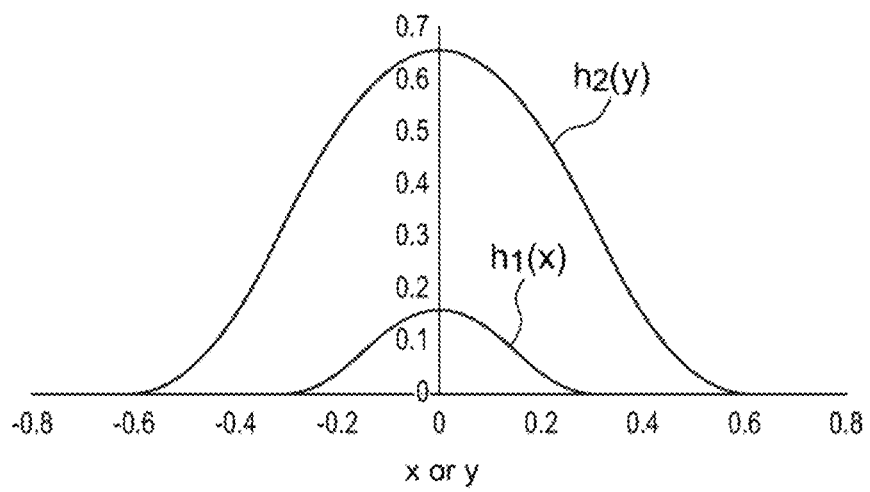
FIG. 2 shows the shapes of $h_1(x)$ and $h_2(y)$.

$g(x, y) = h_1(x) \cdot h_2(y)$ $h_1(x) = \begin{cases} 0 \text{ at } x \notin (-0.3, 0.3) \\ 3.6(x+0.3)^2 + 0.5(x+0.3)^4 \text{ at } x \in (-0.3, -0.15) \\ 3.6(-x^2 + 2 \cdot 0.15^2) + 0.5(-x^4 + 2 \cdot 0.15^4) \text{ at } x \in [-0.15, 0.15] \\ 3.6(x-0.3)^2 + 0.5(x-0.3)^4 \text{ at } x \in (0.15, 0.3) \end{cases}$ $h_2(y) = \begin{cases} 0 \text{ at } y \notin (-0.6, 0.6) \\ 3.6(y+0.6)^2 + 0.5(y+0.6)^4 \text{ at } y \in (-0.6, -0.3) \\ 3.6(-y^2 + 2 \cdot 0.3^2) + 0.5(-y^4 + 2 \cdot 0.3^4) \text{ at } y \in [-0.3, 0.3] \\ 3.6(y-0.6)^2 + 0.5(y-0.6)^4 \text{ at } x \in (0.3, 0.6) \end{cases}$ FIG. 2 shows the shapes of $h_1(x)$ and $h_2(y)$. The horizontal axis of FIG. 2 indicates x coordinate or y coordinate, and the vertical axis of FIG. 2 indicates $h_1(x)$ or $h_2(y)$. The shapes of $h_1(x)$ and $h_2(y)$ are determined such that intensity of the diffused light on an illuminated surface can be made as uniform as possible.

Figure 3:
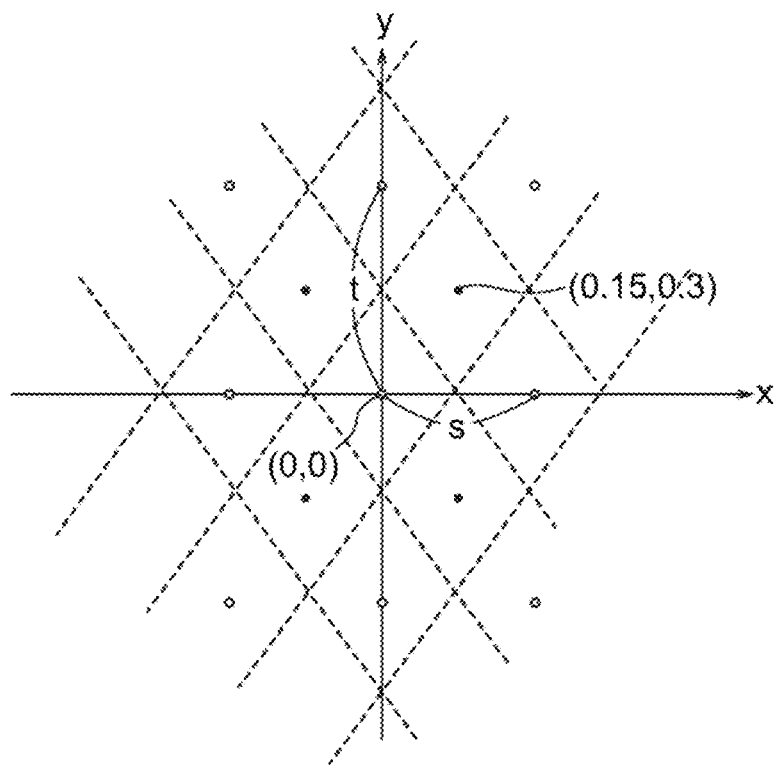
FIG. 3 illustrates the whole shape represented by $z=f(x, y)$.

FIG. 3 illustrates the whole shape represented by z=f(x, y). In FIG. 3, the lattice points are represented by black dots, and the centers of the rectangles are represented by circles. The center of the reference rectangle is defined as the origin.

In FIG. 3, at the portions represented by dashed lines, the portions corresponding to sides of diamonds, the relationship z=0 holds. Within a diamond that is surrounded by the dashed lines and contains a circle, a convex shape is formed, and within a diamond that is surrounded by the dashed lines and contains a black dot, a concave shape is formed.

Figure 4:
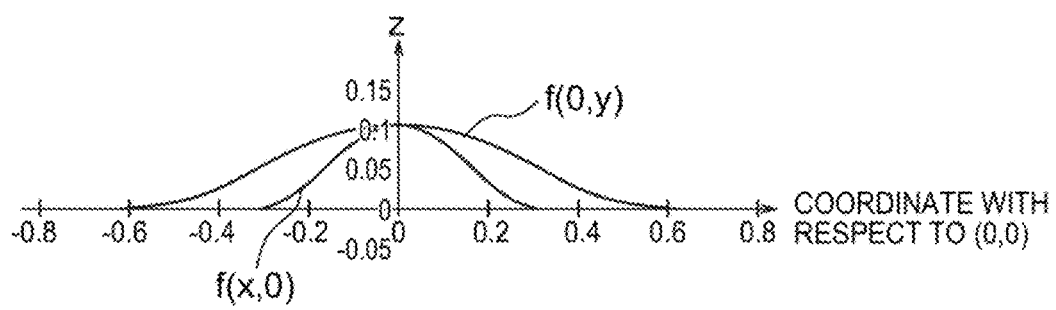
FIG. 4 shows $z=f(x, 0)$ and $z=(0, y)$ that corresponds to a convex shape in the whole shape represented by $z=f(x, y)$.

FIG. 4 shows cross sections of a convex shape represented by z=f(x, 0) and z=f(0, y) in the whole shape represented by z=f(x, y). The horizontal axis of FIG. 4 indicates x coordinate or y coordinate, and the vertical axis of FIG. 4 indicates z coordinate.

Figure 5:
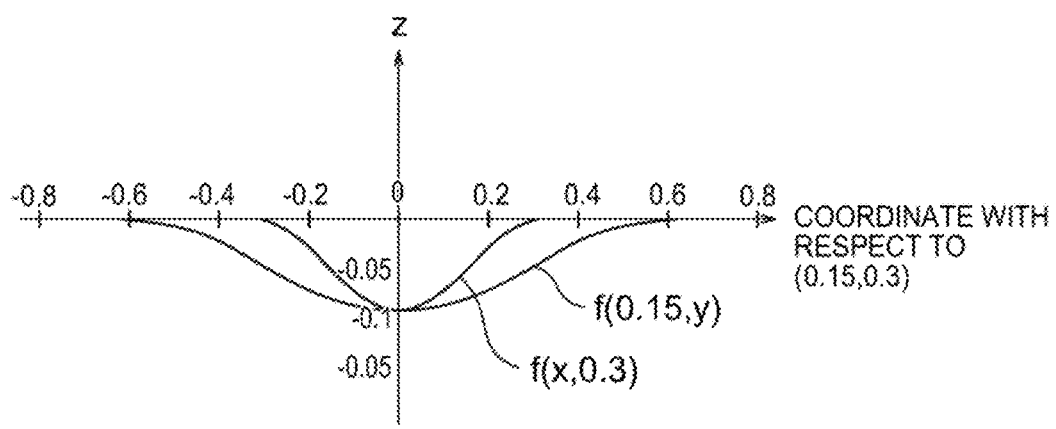
FIG. 5 shows $z=f(x, 0.3)$ and $z=f(1.5, y)$ that corresponds to a concave shape in the whole shape represented by $z=f(x, y)$.

FIG. 5 shows cross sections of a concave shape represented by z=f(x, 0.3) and z=f(1.5, y) in the whole shape represented by z=f(x, y). The horizontal axis of FIG. 5 indicates x coordinate or y coordinate in the case where (0.15, 0.3) is defined as the origin, and the vertical axis of FIG. 5 indicates z coordinate.

When convex or concave shapes that are identical with one another are arranged at regular intervals, rays of light that have passed through the diffuser interfere with one another and generate diffraction so that intensity on an illuminated surface is not uniform disadvantageously. A possible solution is that intervals between adjacent convex shapes or adjacent concave shapes are made irregular or height of convex shapes or concave shapes is irregularly changed.

Figure 6:
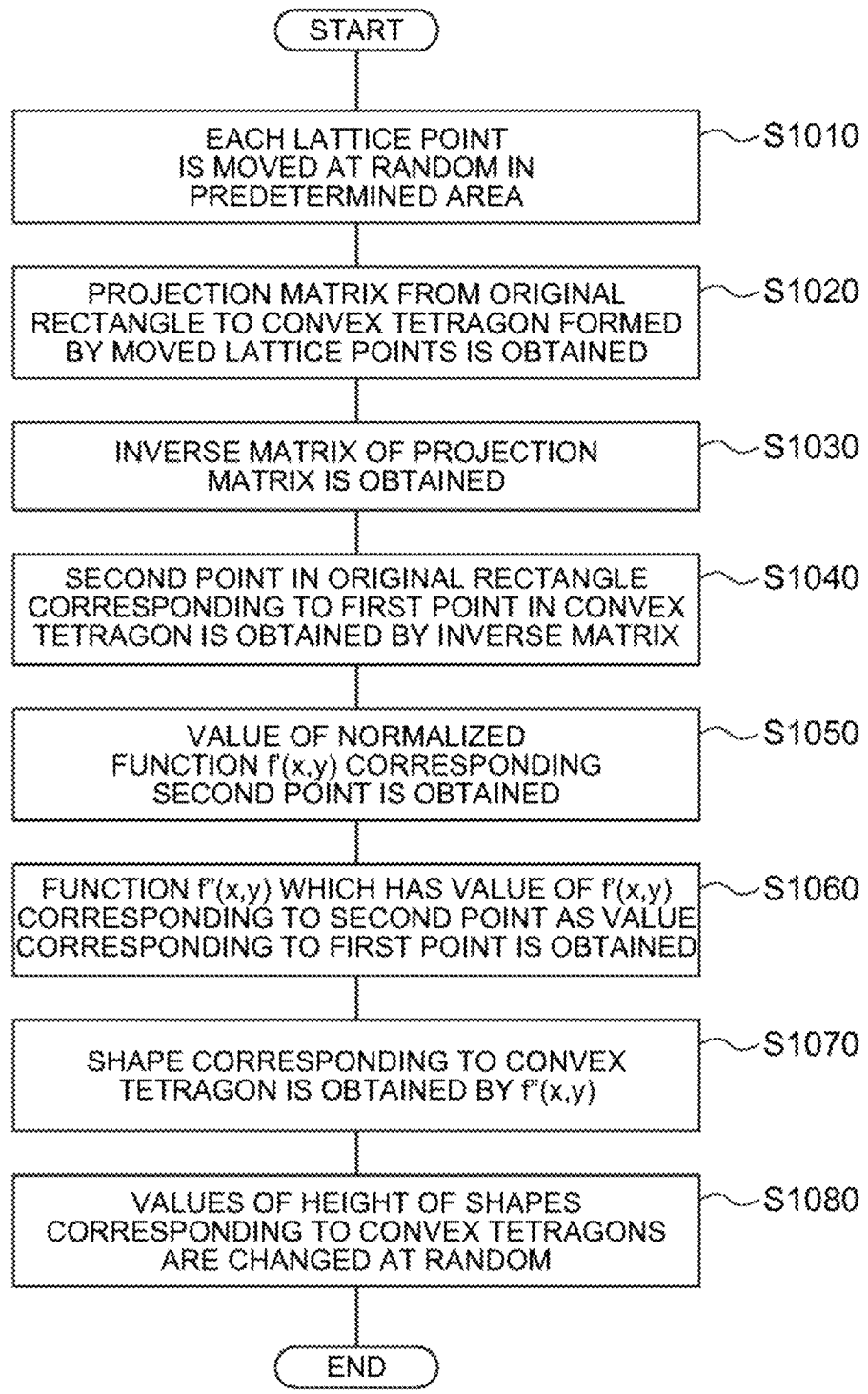
FIG. 6 is a flowchart for illustrating a method for making intervals between adjacent convex shapes or adjacent concave shapes irregular.

FIG. 6 is a flowchart for illustrating a method for making intervals between adjacent convex shapes or adjacent concave shapes irregular.

FIGS. 7 to 10 illustrate the method shown in FIG. 6 for making intervals between adjacent convex shapes or adjacent concave shapes irregular.

In step S1010 in FIG. 6, each lattice point is move at random in a predetermined area around the each lattice point on the xy plane.

Figure 7:
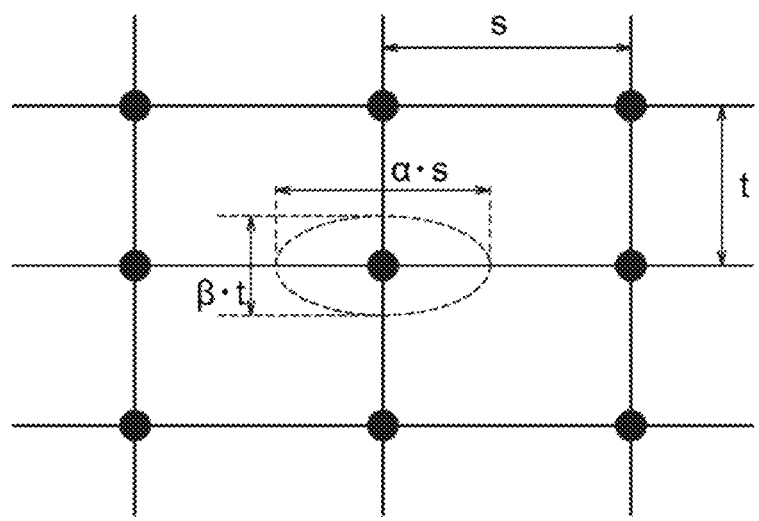
FIG. 7 shows lattice points on the xy plane and a predetermined area on the xy plane in which each of the lattice points is moved.

FIG. 7 shows lattice points on the xy plane and a predetermined area on the xy plane within which one of the lattice points is to be moved. The predetermined area is of ellipse having an axis of length of α·s in the x axis direction and an axis of length of β·t in they axis direction, by way of example. Values of a and 13 should preferably range preferably from 0.1 to 0.4. Each of the lattice points is moved in the predetermined area corresponding to and around the each of the lattice points. The lattice points are moved such that relative positions of the moved points are uniformly distributed in the ellipses. In general, an area within which each of the lattice points is to be moved can be a predetermined area around the each of the lattice points. The lattice points can be moved such that relative positions of the moved points are uniformly distributed in the predetermined areas.

Figure 8:
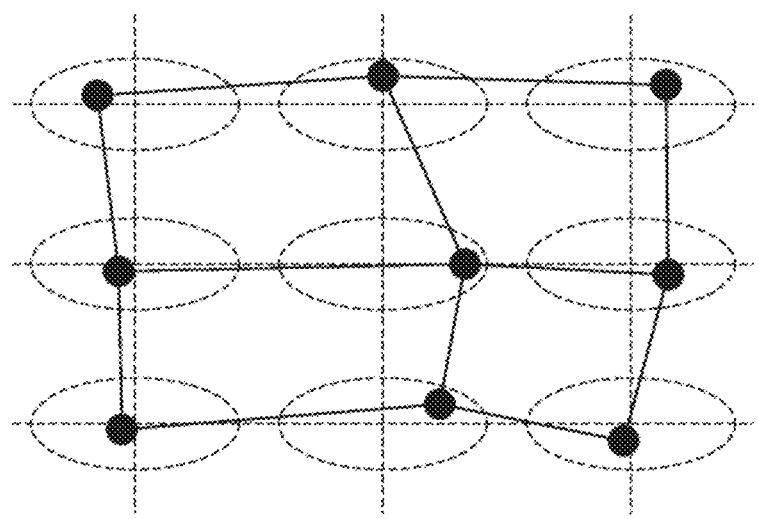
FIG. 8 shows positions of points corresponding to respective lattice points after having moved the respective lattice points.

FIG. 8 shows positions of points corresponding to respective lattice points after the movement.

In step S1020 in FIG. 6, a projection matrix from an original rectangle to a convex tetragon formed by moved lattice points. The predetermined area around each lattice point should be determined such that moved lattice points form a convex tetragon (in general, a convex polygon).

Figure 9:
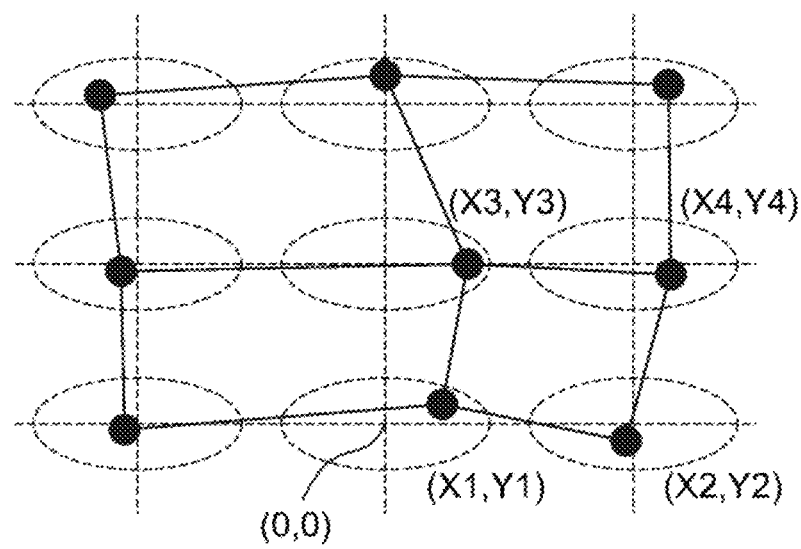
FIG. 9 shows a convex tetragon formed by moved lattice points.

FIG. 9 shows a convex tetragon formed by moved lattice points. In order to determine coordinates of the vertexes (x1, y1), (x2, y2), (x3, y3), and (x4, y4) of each convex tetragon, the left lower vertex of the original rectangle is defined as the origin.

Figure 10:
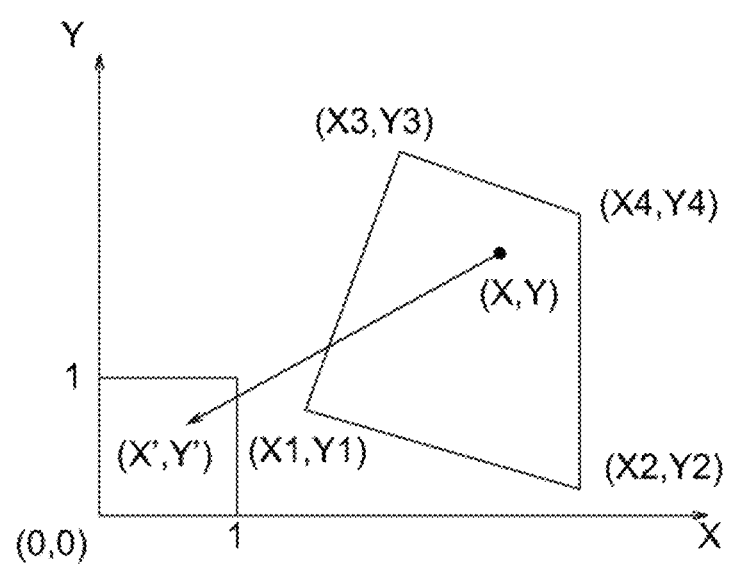
FIG. 10 shows a convex tetragon formed by the moved points and a rectangle that has been obtained by normalizing the original rectangle.

FIG. 10 shows a convex tetragon formed by the moved points and a rectangle that has been obtained by normalizing the original rectangle. By way of example, the normalized rectangle is a square the lower left vertex of which lies at the origin and which has sides length of which is 1.

An example of a projection matrix from the normalized rectangle to a convex tetragon formed by moved lattice points is given below.

$$A = \begin{bmatrix} A11 & A12 & A13 \\ A21 & A22 & A23 \\ A31 & A32 & A33 \end{bmatrix}$$

$A13 = X1$ $A23 = Y1$ $A31 = \dfrac{\{(X4-X3)^*(Y1-Y2) - (Y4-Y3)^*(X1-X2)\}}{\{(Y4-Y3)^*(X4-X2) - (X4-X3)^*(Y4-Y2)\}}$ $A32 = \dfrac{\{(X4-X2)^*(Y1-Y3) - (Y4-Y2)^*(X1-X3)\}}{\{(Y4-Y2)^*(X4-X3) - (X4-X2)^*(Y4-Y3)\}}$ $A11 = (A31+1)^* X2 - X1$ $A12 = (A32+1)^* X3 - X1$ -continued $A21 = (A31+1)^* Y2 - Y1$ $A22 = (A32+1)^* Y3 - Y1$ $A33 = 1$ By the projection matrix A, an arbitrary point (x', y') in the normalized rectangle is projected to a point (x, y) in the convex tetragon.

$$\begin{bmatrix} X \\ Y \\ 1 \end{bmatrix} = A \begin{bmatrix} X' \\ Y' \\ 1 \end{bmatrix}$$

Vertexes of the normalized rectangle are projected as below by the projection matrix A, for example.

$X'=0, Y=0$ to $X=X1, Y=Y1$ $X'=1, Y=0$ to $X=X2, Y=Y2$

In step S1030 in FIG. 6, the inverse matrix $A^{-1}$ of the projection matrix A is obtained.

In step S1040 in FIG. 6, by the inverse matrix $A^{-1}$, a second point (X', Y) in the normalized rectangle corresponding to an arbitrary first point (X, Y) in the convex tetragon is obtained.

$$\begin{bmatrix} X' \\ Y' \\ 1 \end{bmatrix} = A^{-1} \begin{bmatrix} X \\ Y \\ 1 \end{bmatrix}$$

In step S1050 in FIG. 6, the value of a normalized function f(x, y) corresponding to the second point (X', Y') is obtained. The normalized function f(x, y) is obtained by normalizing the area of (−0.3, 0.3) of x and (−0.6. 0.6) of y of f(x, y) to the area of (0, 1) of x and (0,1) of y.

In step S1060 in FIG. 6, a function f'(x, y) is obtained. The function f'(x, y) is determined such that the value of f'(x, y) for first point (X, Y) is equal to the value of the normalized function f(x, y) for the second point (X', Y'). The function f'(x, y) is smooth like the function f(x,y).

In the above, a rectangle which has been obtained by normalizing the original rectangle is used to obtain the value of f'(x, y) for a point in the convex tetragon formed by moved points. In another embodiment, the original rectangle can directly be used.

In step S1070 in FIG. 6, by the function f'(x, y) the shape of a diffuser corresponding to the convex tetragon, coordinates of the vertexes of which are (X, Y), (X, Y), (X, Y), and (X, Y) is determined. Even after plural rectangles that have the identical shape have been changed to convex tetragons that have various shapes by irregularly changing positions of the lattice, a diffuser having a smooth shape can be obtained.

In step S1080 in FIG. 6, height of the shapes corresponding to the respective convex tetragons are changed at random. The height of each shape should preferably be uniformly distributed in the range of 0.9 to 1.1 times as great as the value of the function f'(x, y).

By determining the shape as described above, influence of diffraction caused by a periodic structure can be reduced, and intensity of diffused light on an illuminated surface can be made more uniform.

Figure 11:
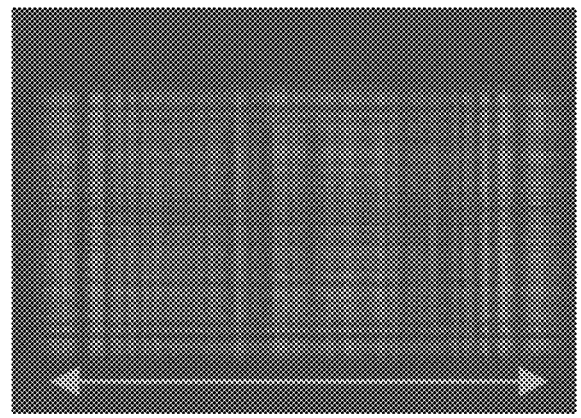
FIG. 11 shows a distribution of intensity of light obtained when parallel light that is perpendicular to the xy plane is made to enter a diffuser having the shape of $z=f(x, y)$, positions of lattice points and height of the shape remaining unchanged.

FIG. 11 shows a distribution of intensity of light obtained when parallel light that is perpendicular to the xy plane is made to enter a diffuser having the shape of z=f(x, y), positions of the lattice points and height of the shapes remaining unchanged. In the xz cross section, angle of diffusion (full-width) is 12 degrees, and in the yz cross section, angle of diffusion (full-width) is 8.8 degrees.

Figure 12:
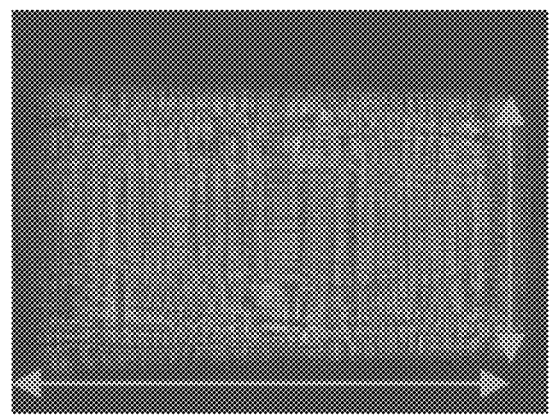
FIG. 12 shows a distribution of intensity of light obtained when parallel light that is perpendicular to the xy plane is made to enter a diffuser having the shape of $z=f'(x, y)$, positions of lattice points and height of the shape having been irregularly changed.

FIG. 12 shows a distribution of intensity of light obtained when parallel light that is perpendicular to the xy plane is made to enter a diffuser having the shape of z=f'(x, y), positions of the lattice points and height of the shapes having been irregularly changed. In the xz cross section, the maximum and minimum values of angle of diffusion is ±6 degrees, and in the yz cross section, the maximum and minimum values of angle of diffusion is ±4.4 degrees.

In FIGS. 11 and 12, intensity of light or illuminance on the illuminated surface is represented by shade, and illuminance is relatively high at white portions. When FIG. 11 and FIG. 12 are compared with each other, the illuminance distribution shown in FIG. 12 is more uniform than the illuminance distribution shown in FIG. 11.

Figure 13:
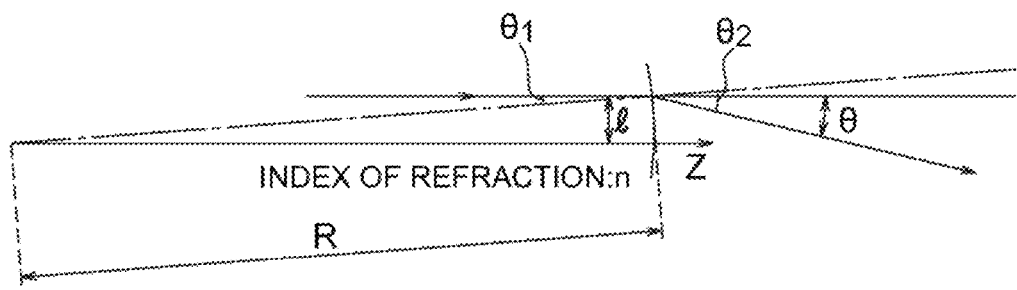
FIG. 13 illustrates angle of diffusion of rays diffused by a diffuser.

FIG. 13 illustrates angle of diffusion of rays diffused by a diffuser. It is assumed that rays travelling in the z axis direction shown in FIGS. 4 and 5 are diffused by the diffuser. Distance between a point on a surface of the diffuser through which a ray passes and the z axis is represented by l, angle of incidence onto the surface and angle of refraction at the surface are represented respectively by $\theta_1$ and $\theta_2$, index of refraction of the material of the diffuser is represented by n, and radius of curvature at the point of the surface is represented by R. Angle of diffusion that is an angle formed by a ray having passed through the diffuser with the z axis is represented by $\theta$, and the following relationships hold when $\theta_1$ and $\theta_2$ are small enough.

$n \sin \theta_1 = \sin \theta_2$, $n\theta_1 \approx \theta_2$ $R\theta_1 \approx l$ From the relationships described above, the following expression is obtained.

$$\theta = \theta_2 - \theta_1 \approx (n-1) \cdot \theta_1 \approx \frac{(n-1) \cdot l}{R}$$

For the value of l one fourth of the length of the convex shape in FIG. 4 is employed, for the value of R the average value of radius of curvature is employed, and a value of angle of diffusion is obtained by substituting these values into the above-described expression. Thus, angle of diffusion is determined by the shape of a diffuser.

The diffuser in the example described above has a shape based on a rectangular lattice. In other embodiments, shapes can be formed using plane lattices including a diamond lattice, a hexagonal lattice, a square lattice, and a parallelotope lattice, instead of a rectangular lattice. In such cases, a function z=g(x, y) can be determined such that the function represents a shape in a unit figure such as a diamond and a equilateral hexagon, the unit figure being a part of a plane lattice, with the origin located at the center of the unit figure, the shape being symmetric with respect to the x and with respect to the y axis and smooth. Further, the function can be determined such that a single extreme value exits on the z-axis.

When S represents an area within the reference rectangle and $\delta s$ represents the boundary of the area, that is, the sides of the unit figure, the following relationships hold When $(x, y) \notin S$, $g(x, y) = 0$.

When $(x, y) \in \partial S$, $g(x, y) = 0$, $\frac{\partial g(x, y)}{\partial x} = 0$, $\frac{\partial g(x, y)}{\partial y} = 0$, $\frac{\partial^2 g(x, y)}{\partial x^2} = 0$, and $\frac{\partial^2 g(x, y)}{\partial y^2} = 0$.

In this embodiment, like the embodiment using a rectangular lattice, when the whole shape of a diffuser is represented by z=f(x, y), coordinates of the center of an arbitrary unit figure are represented by $(x_k, y_k)$ and coordinates of the center of a unit figure adjacent to the arbitrary unit figure are represented by $(x_{k'}, y_{k'})$, the shape represented by $$(x_l, y_l) = \left(\frac{x_k + x_{k'}}{2}, \frac{y_k + y_{k'}}{2}\right)$$

$$z = f(x, y) = \sum_{k,l} g(x - x_k, y - y_k) - g(x - x_l, y - y_l)$$

is obtained.

Further, like the case in which a rectangular lattice is used, the shape of each unit figure is changed by changing positions of lattice points in a predetermined area, a function f'(x, y) for the changed unit figures is obtained, and by the function f'(x, y) the shape of a diffuser corresponding to the changed unit figures can be determined. Further, height of the shape corresponding to each unit figure can be changed at random.

Thus, even when a diamond lattice, a hexagonal lattice, a square lattice or a parallelotope lattice is used instead of a rectangular lattice, influence of diffraction caused by a periodic structure can be reduced, and intensity of diffused light on an illuminated surface can be made more uniform.

A lattice can be formed on curved surfaces including a spherical surface and an aspherical surface. In such a case, the present invention can be applied by projecting a plane lattice onto a curved surface.

The relationship between the shape of a diffuser and angle of diffusion will be further described. In a plane perpendicular to the xy plane, for example the xz plane, angle of diffusion means an angle between a straight line perpendicular to the xy plane, for example the z axis and a ray of light having passed through the diffuser and travelling in the plane.

Figure 14:
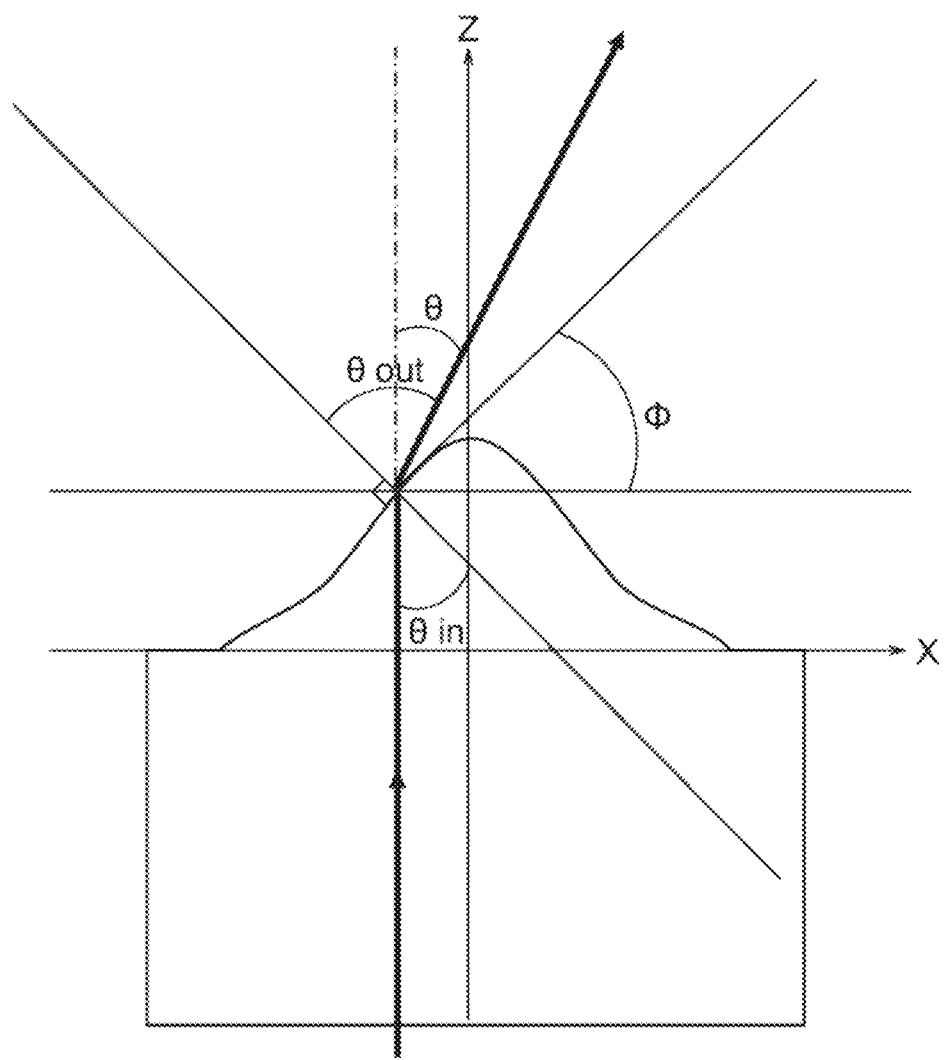
FIG. 14 illustrates the relationship between the shape of a diffuser and angle of diffusion.

FIG. 14 illustrates the relationship between the shape of a diffuser and angle of diffusion. FIG. 14 shows a xz cross section of the diffuser. The arrows in FIG. 14 show travelling directions of a ray of light. The ray of light travels in the direction perpendicular to the xy plane and enters the diffuser. $\theta_{in}$ represents angle of incidence of the ray of light onto a surface of the convex shape of the diffuser, and $°$ out represents angle of refraction. $\theta$ represents angle of diffusion. In FIG. 14, the absolute value of an angle between a tangential line at a point to a curve representing the surface of the diffuser and the x axis is referred to as tangential angle $\phi$. From the definition of tangential angle, the following relationship holds at the point where the ray of light passes through the surface.

$$\phi = \theta_{in}$$

From the Snell's law, the following relationship holds.

$$n \cdot \sin \phi = \sin(\phi + \theta) \quad (1)$$

"n" represents index of refraction of the material of the diffuser. According to Expression (1), when a ray of light perpendicular to the xy plane passes through the vertex of the convex shape of the diffuser, angle of incidence $\theta_{in}$ and tangential angle $\phi$ are 0 degree, and angle of diffusion $\theta$ is also 0 degree. When the shape in the cross section is smooth, the absolute value of angle of diffusion $\theta$ increases with tangential angle $\phi$ and reaches the maximum value when tangential angle $\phi$ reaches the maximum value. On the other hand, the absolute value of tangent of tangential angle $\phi$ is equal to the absolute value of a first derivative of a curve $z=f(x)$ representing the shape of the xz cross section of the diffuser, and is represented as below.

$$|\tan\phi| = \left|\frac{df}{dx}\right| \quad (2)$$

Thus, the maximum value of the absolute value of angle of diffusion in the xz cross section of the diffuser is determined by the maximum value of the absolute value of tangent of tangential angle in the xz cross section of the diffuser, that is the maximum value of the absolute value of first derivative of a curve representing the shape of the xz cross section of the diffuser.

Other embodiments of the present invention will be described below. The shapes in the reference rectangle of the embodiments are represented by the following expressions. Length of the sides in the x axis direction of the reference rectangle is s millimeters, and length of the sides in the y axis direction of the reference rectangle is t millimeters.

$$g(x, y) = h_1(x) \cdot h_2(y)$$

$$h_1(x) = \begin{cases} 0, & x \notin \left(-\frac{s}{2}, \frac{s}{2}\right) \\ \sum_{i=1}^{N} A_i \left(x + \frac{s}{2}\right)^i, & x \in \left(-\frac{s}{2}, -\frac{s}{4}\right) \\ \sum_{i=1}^{N} A_i \left(-(-1)^i x^i + 2\left(\frac{s}{4}\right)^i\right), & x \in \left[-\frac{s}{4}, 0\right] \\ \sum_{i=1}^{N} A_i \left(-x^i + 2\left(\frac{s}{4}\right)^i\right), & x \in \left(0, \frac{s}{4}\right] \\ \sum_{i=1}^{N} A_i (-1)^i \left(x - \frac{s}{2}\right)^i, & x \in \left(\frac{s}{4}, \frac{s}{2}\right) \end{cases}$$

$$h_2(y) = \begin{cases} 0, & y \notin \left(-\frac{t}{2}, \frac{t}{2}\right) \\ \sum_{j=1}^{M} B_j \left(y + \frac{t}{2}\right)^j, & y \in \left(-\frac{t}{2}, -\frac{t}{4}\right) \\ \sum_{j=1}^{M} B_j \left(-(-1)^j y^j + 2\left(\frac{t}{4}\right)^j\right), & y \in \left[-\frac{t}{4}, 0\right] \\ \sum_{j=1}^{M} B_j \left(-y^j + 2\left(\frac{t}{4}\right)^j\right), & y \in \left(0, \frac{t}{4}\right] \\ \sum_{j=1}^{M} B_j (-1)^j \left(y - \frac{t}{2}\right)^j, & y \in \left(\frac{t}{4}, \frac{t}{2}\right) \end{cases}$$

Example 1

In Example 1, coefficients $A_i$ except $A_2$ of $h_1(x)$ are zero, and coefficients $B_j$ except $B_2$ of $h2_i(y)$ are zero. The functions $h_1(x)$ and $h2_1(y)$ are determined such that maximum and minimum values of angle of diffusion in the xz cross section are ±9 degrees and maximum and minimum values of angle of diffusion in the yz cross section are ±7 degrees, and the coefficients are determined as below.

$$s=0.3, A_1=0, A_2=10, A_3=0$$

$$t=0.4, B_1=0, B_2=10, B_3=0$$

Values of $A_i$ and $B_i$ are zero when i is 4 or greater.
The functions $h_1(x)$ and $h2_1(y)$ are represented as below.

$$h_1(x) = \begin{cases} 0, & x \notin \left(-\frac{0.3}{2}, \frac{0.3}{2}\right) \\ 10\left(x + \frac{0.3}{2}\right)^2, & x \in \left(-\frac{0.3}{2}, -\frac{0.3}{4}\right) \\ 10\left(-x^2 + 2\left(\frac{0.3}{4}\right)^2\right), & x \in \left[-\frac{0.3}{4}, \frac{0.3}{4}\right] \\ 10\left(x - \frac{0.3}{2}\right)^2, & x \in \left(\frac{0.3}{4}, \frac{0.3}{2}\right) \end{cases}$$

$$h_2(y) = \begin{cases} 0, & y \notin \left(-\frac{0.4}{2}, \frac{0.4}{2}\right) \\ 10\left(y + \frac{0.4}{2}\right)^2, & y \in \left(-\frac{0.4}{2}, -\frac{0.4}{4}\right) \\ 10\left(-y^2 + 2\left(\frac{0.4}{4}\right)^2\right), & y \in \left[-\frac{0.4}{4}, \frac{0.4}{4}\right] \\ 10\left(y - \frac{0.4}{2}\right)^2, & y \in \left(\frac{0.4}{4}, \frac{0.4}{2}\right) \end{cases}$$

The shape of the diffuser of Example 1 is a combination of convex shapes represented by $g(x, y)$ and concave shapes represented by $-g(x, y)$, and is represented by the following expression.

$$z = f(x, y) = \sum_{m,n} \left[ g(x - ms, y - nt) - g\left(x - \frac{2m+1}{2}s, y - \frac{2n+1}{2}t\right) \right] \quad (3)$$

Figure 15:
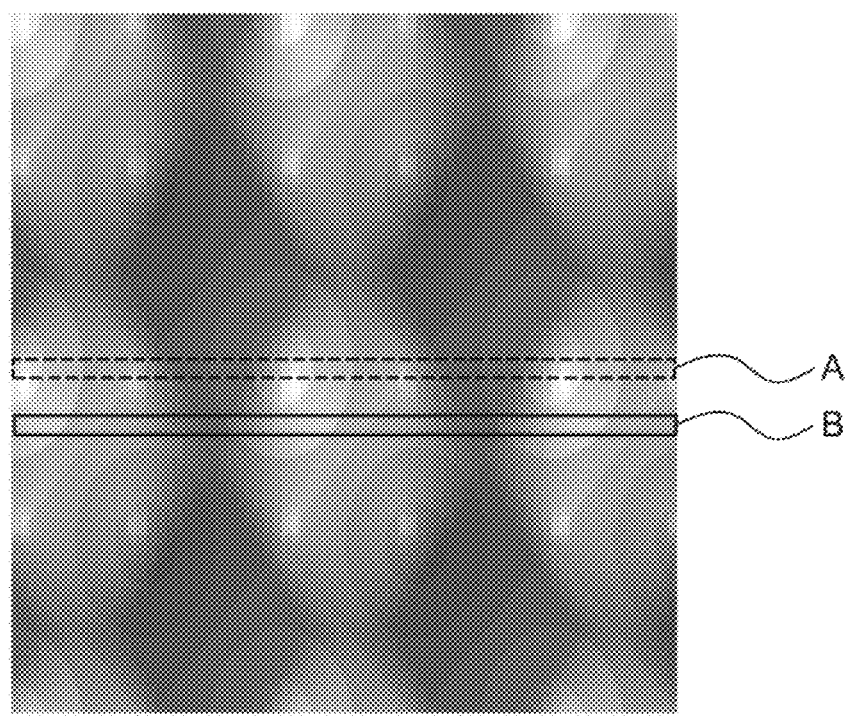
FIG. 15 shows a plan view of the diffuser of Example 1.
Figure 16:
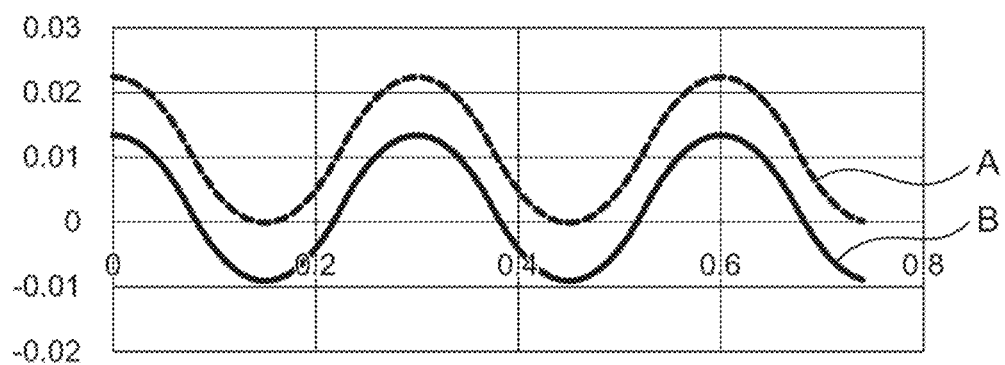
FIG. 16 shows xz cross sections of the diffuser of Example 1, the cross sections corresponding to the straight line that is parallel to and equidistant from the two straight lines marked with A and the straight line that is parallel to and equidistant from the two straight lines marked with B in FIG. 15.

FIG. 15 shows a plan view of the diffuser of Example 1.
FIG. 16 shows xz cross sections of the diffuser of Example 1, the cross sections corresponding to the straight line that is parallel to and equidistant from the two straight lines marked with A and the straight line that is parallel to and equidistant from the two straight lines marked with B in FIG. 15. The horizontal axis of FIG. 16 indicates x coordinate, and the unit is millimeter. The vertical axis of FIG. 16 indicates z coordinate, and the unit is millimeter.

Figure 17:
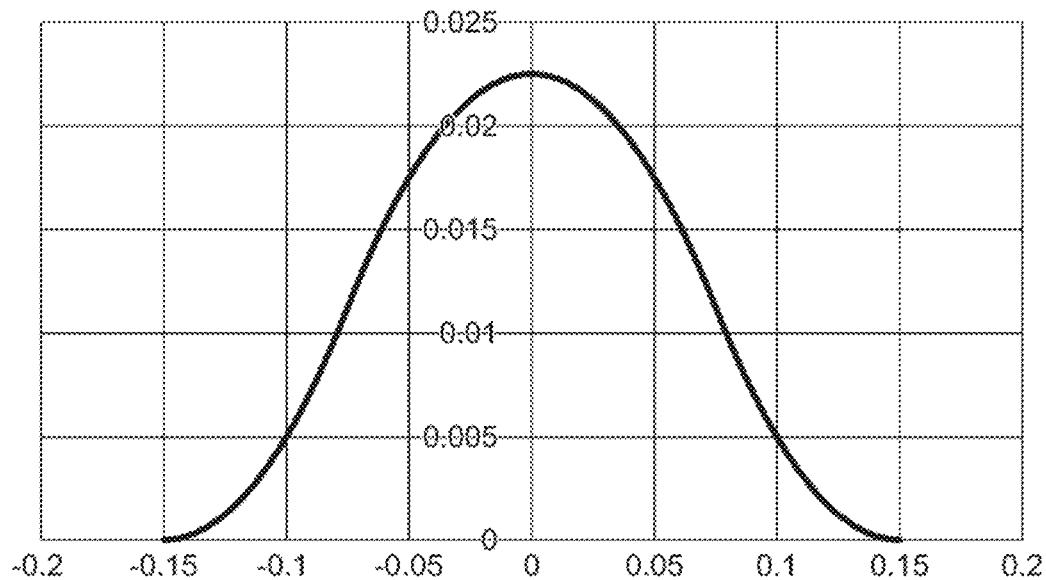
FIG. 17 shows the shape $h_1(x)$ of the diffuser of Example 1.

FIG. 17 shows the shape $h_1(x)$ of the diffuser of Example 1. FIG. 17 shows the xz cross section of the diffuser at y=0. The horizontal axis of FIG. 17 indicates x coordinate, and the unit is millimeter. The vertical axis of FIG. 17 indicates z coordinate, and the unit is millimeter.

Figure 18:
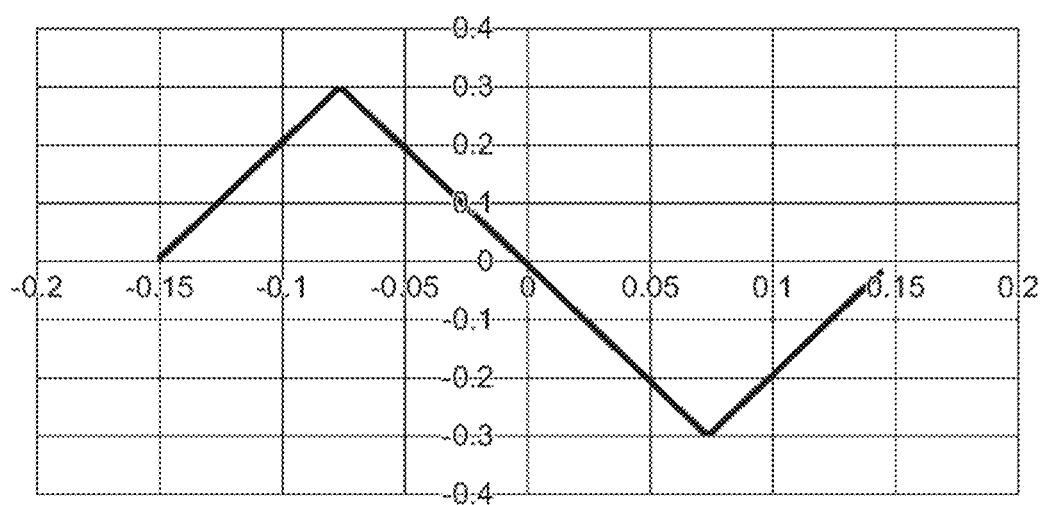
FIG. 18 shows first derivative of the function shown in FIG. 17.

FIG. 18 shows first derivative of the function shown in FIG. 17. The horizontal axis of FIG. 18 indicates x coordinate, and the unit is millimeter. The vertical axis of FIG. 18 indicates first derivative that has no units. From FIG. 18, the maximum value of the absolute value of first derivative $$\left|\frac{df}{dx}\right|$$

is 0.3. From Expression (2), the maximum value of tangential angle $\phi$ is 16.7 degrees. By substituting the above-described value and n=1.5 into Expression (1), the maximum value of angle of diffusion $\theta$ is approximately 9 degrees.

Figure 19:
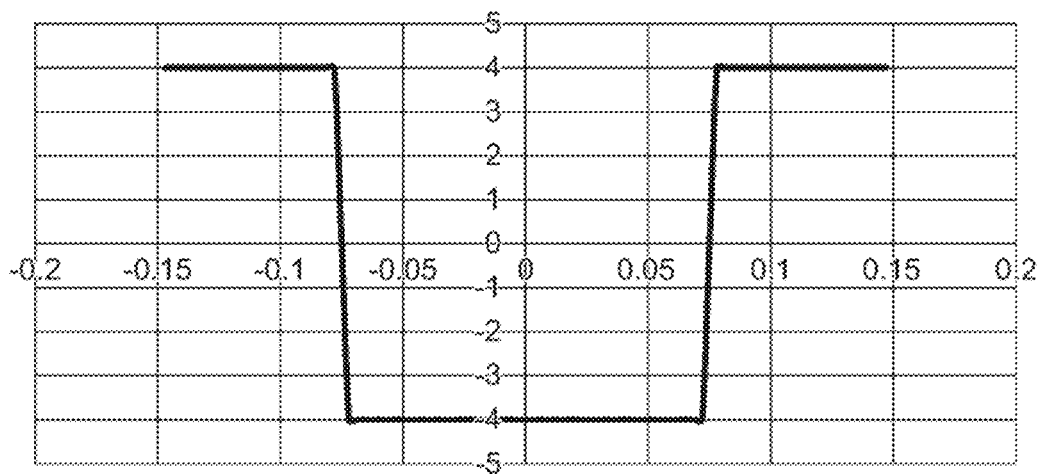
FIG. 19 shows second derivative of the function shown in FIG. 17.

FIG. 19 shows second derivative of the function shown in FIG. 17. The horizontal axis of FIG. 19 indicates x coordinate, and the unit is millimeter. The vertical axis of FIG. 19 indicates second derivative, and the unit is the inverse of millimeter.

Figure 20:
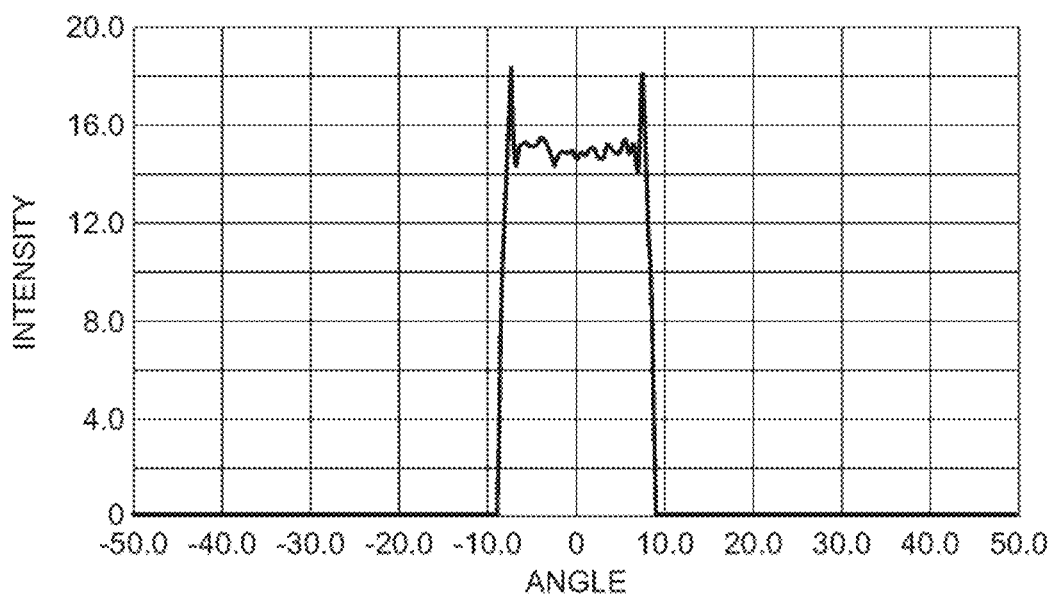
FIG. 20 shows a distribution of intensity of rays of light in the xz cross section, the rays having traveled in the direction perpendicular to the xy plane, entered and passed through the diffuser of Example 1.

FIG. 20 shows a distribution of intensity of rays of light in the xz cross section, the rays having traveled in the direction perpendicular to the xy plane, entered and passed through the diffuser of Example 1. The horizontal axis of FIG. 20 indicates angle of diffusion in the xz cross section, and the unit is degree. The vertical axis of FIG. 20 indicates intensity of rays of light in the xz cross section, and the unit is arbitrary one that shows relative values of intensity in Example 1. According to FIG. 20, the maximum and minimum values of angle of diffusion are ±9 degrees, and the shape showing the distribution of intensity has steeps around the values.

Figure 21:
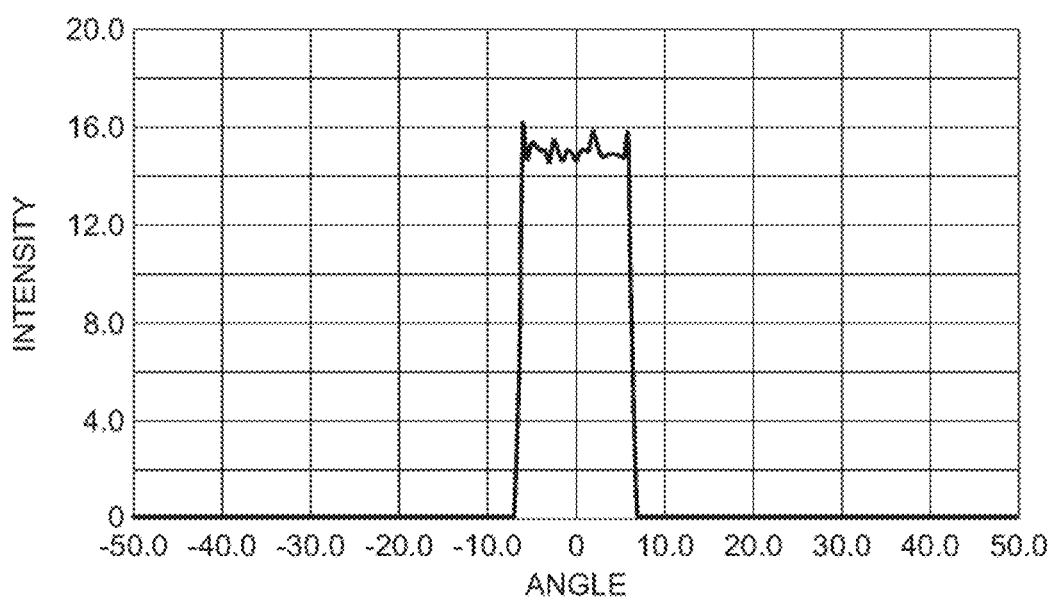
FIG. 21 shows a distribution of intensity of rays of light in the yz cross section, the rays having traveled in the direction perpendicular to the xy plane, entered and passed through the diffuser of Example 1.

FIG. 21 shows a distribution of intensity of rays of light in the yz cross section, the rays having traveled in the direction perpendicular to the xy plane, entered and passed through the diffuser of Example 1. The horizontal axis of FIG. 21 indicates angle of diffusion in the yz cross section, and the unit is degree. The vertical axis of FIG. 21 indicates intensity of rays of light in the yz cross section, and the unit is arbitrary one that shows relative values of intensity in Example 1. According to FIG. 21, the maximum and minimum values of angle of diffusion are ±7 degrees, and the shape showing the distribution of intensity has steeps around the values.

According to FIGS. 20 and 21, intensity of rays diffused by the diffuser of Example 1 is zero when the absolute value of angle of diffusion is greater than the maximum value of angle of diffusion and is substantially equal to a predetermined value when the absolute value of angle of diffusion is equal to or less than the maximum value of angle of diffusion, and thus the shapes of the distribution of intensity are nearly ideal.

Example 2

The function g(x, y) of Example 2 is identical with the function g(x, y) of Example 1. The shape of the diffuser of Example 2 is a combination of convex shapes represented by g(x, y) alone, and is represented by the following expression.

$$z = f(x, y) = \sum_{m,n} [g(x - ms, y - nt)] \qquad (4)$$

Figure 22:
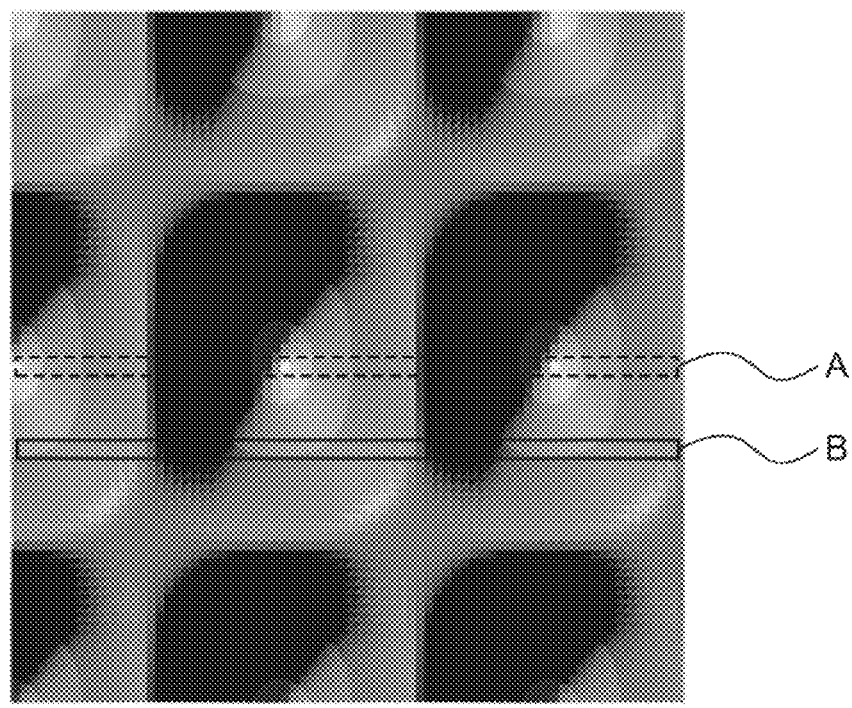
FIG. 22 shows a plan view of the diffuser of Example 2.

FIG. 22 shows a plan view of the diffuser of Example 2.

Figure 23:
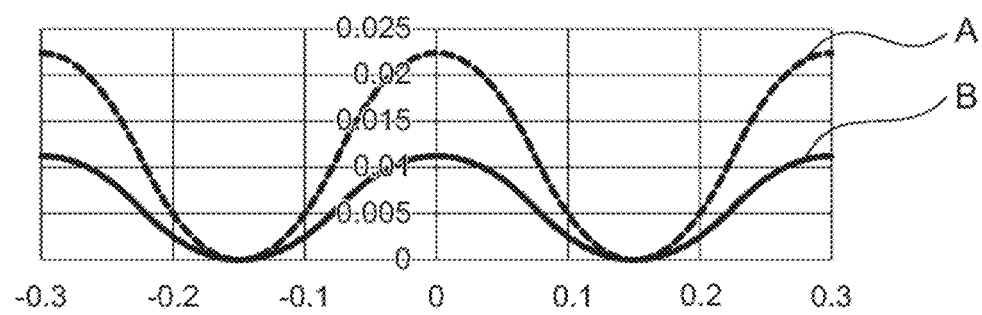
FIG. 23 shows xz cross sections of the diffuser of Example 2, the cross sections corresponding to the straight line that is parallel to and equidistant from the two straight lines marked with A and the straight line that is parallel to and equidistant from the two straight lines marked with B in FIG. 22.

FIG. 23 shows xz cross sections of the diffuser of Example 2, the cross sections corresponding to the straight line that is parallel to and equidistant from the two straight lines marked with A and the straight line that is parallel to and equidistant from the two straight lines marked with B in FIG. 22. The horizontal axis of FIG. 23 indicates x coordinate, and the unit is millimeter. The vertical axis of FIG. 23 indicates z coordinate, and the unit is millimeter.

Figure 24:
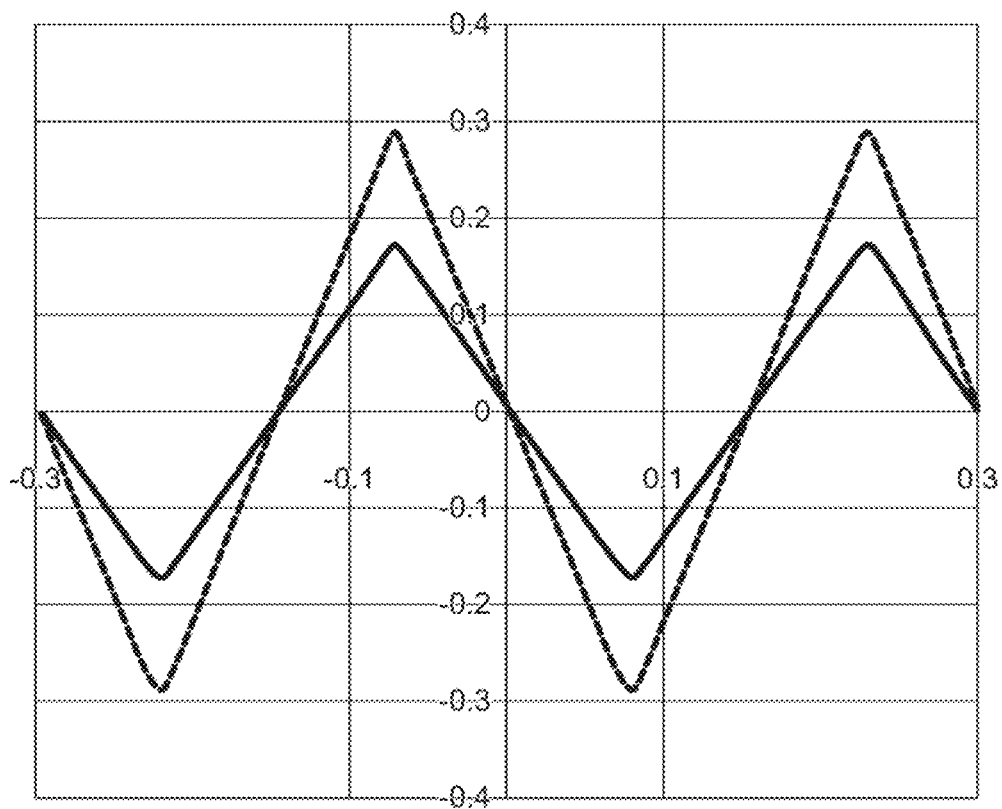
FIG. 24 shows first derivatives of the functions shown in FIG. 23.

FIG. 24 shows first derivatives of the functions shown in FIG. 23. The horizontal axis of FIG. 24 indicates x coordinate, and the unit is millimeter. The vertical axis of FIG. 24 indicates first derivative that has no units.

Figure 25:
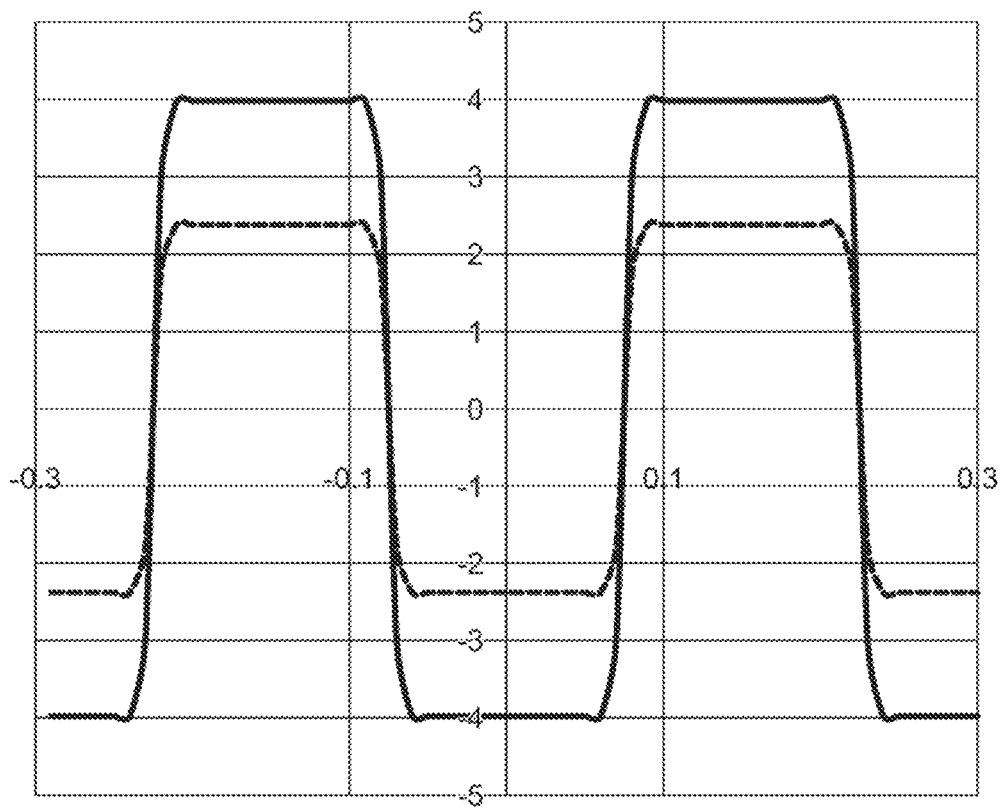
FIG. 25 shows second derivatives of the functions shown in FIG. 23.

FIG. 25 shows second derivatives of the functions shown in FIG. 23. The horizontal axis of FIG. 25 indicates x coordinate, and the unit is millimeter. The vertical axis of FIG. 25 indicates second derivative, and the unit is the inverse of millimeter.

Figure 26A:
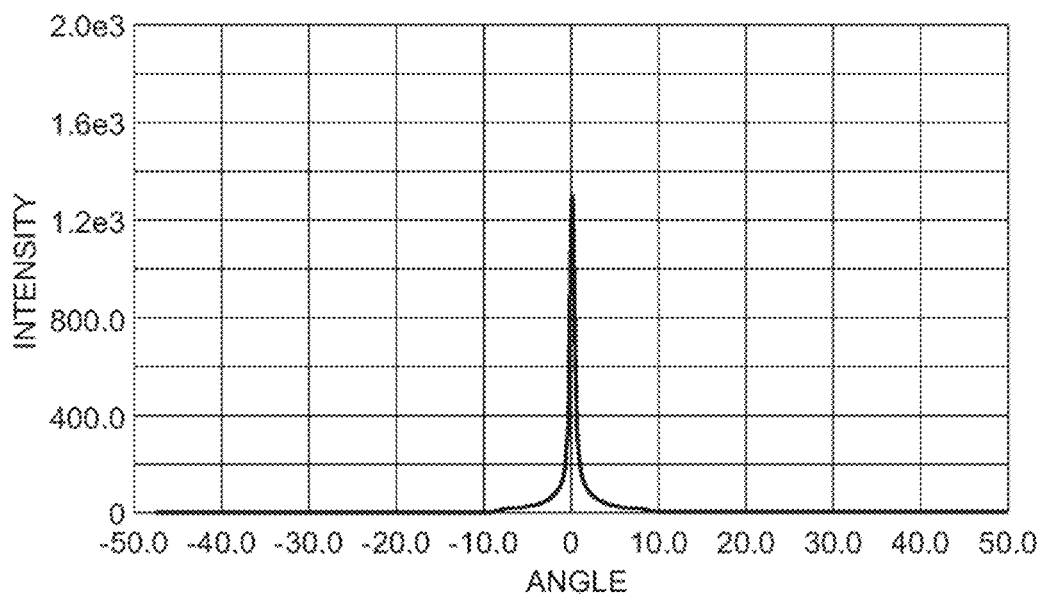
FIG. 26A shows a distribution of intensity of rays of light in the xz cross section, the rays having traveled in the direction perpendicular to the xy plane, entered and passed through the diffuser of Example 2.

FIG. 26A shows a distribution of intensity of rays of light in the xz cross section, the rays having traveled in the direction perpendicular to the xy plane, entered and passed through the diffuser of Example 2. The horizontal axis of FIG. 26A indicates angle of diffusion in the xz cross section, and the unit is degree. The vertical axis of FIG. 26A indicates intensity of rays of light in the xz cross section, and the unit is arbitrary one that shows relative values of intensity in Example 2.

Figure 26B:
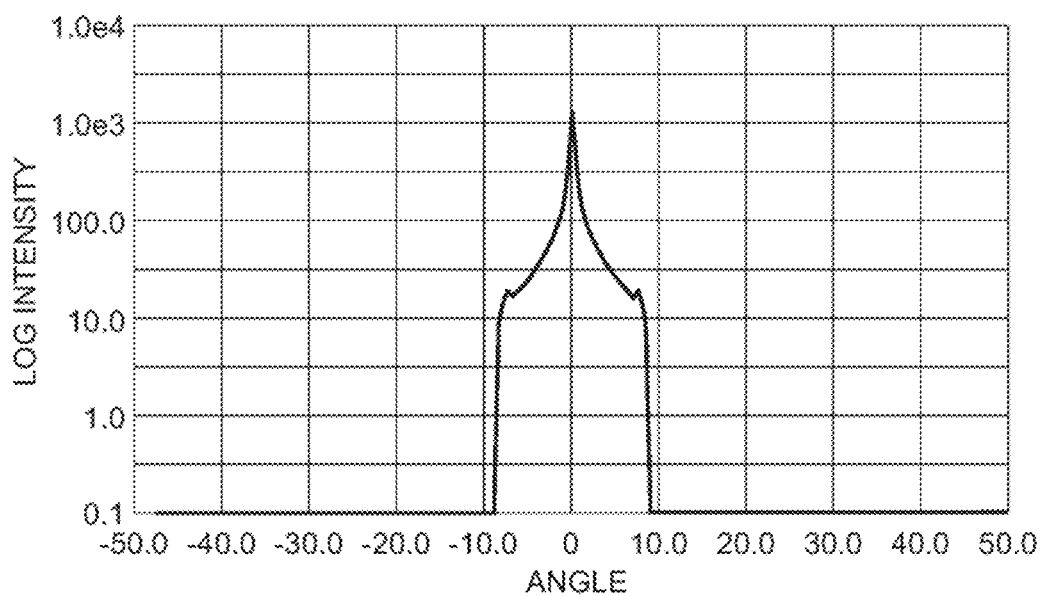
FIG. 26B shows a distribution of intensity of rays of light in the xz cross section, the rays having traveled in the direction perpendicular to the xy plane, entered and passed through the diffuser of Example 2.

FIG. 26B shows a distribution of intensity of rays of light in the xz cross section, the rays having traveled in the direction perpendicular to the xy plane, entered and passed through the diffuser of Example 2. The horizontal axis of FIG. 26B indicates angle of diffusion in the xz cross section, and the unit is degree. The vertical axis of FIG. 26B indicates intensity of rays of light in the xz cross section in a logarithmic scale, and the unit is arbitrary one that shows relative values of intensity in Example 2. According to FIG. 26B, the maximum and minimum values of angle of diffusion are ±9 degrees, and the shape showing the distribution of intensity has steeps around the values.

Figure 27A:
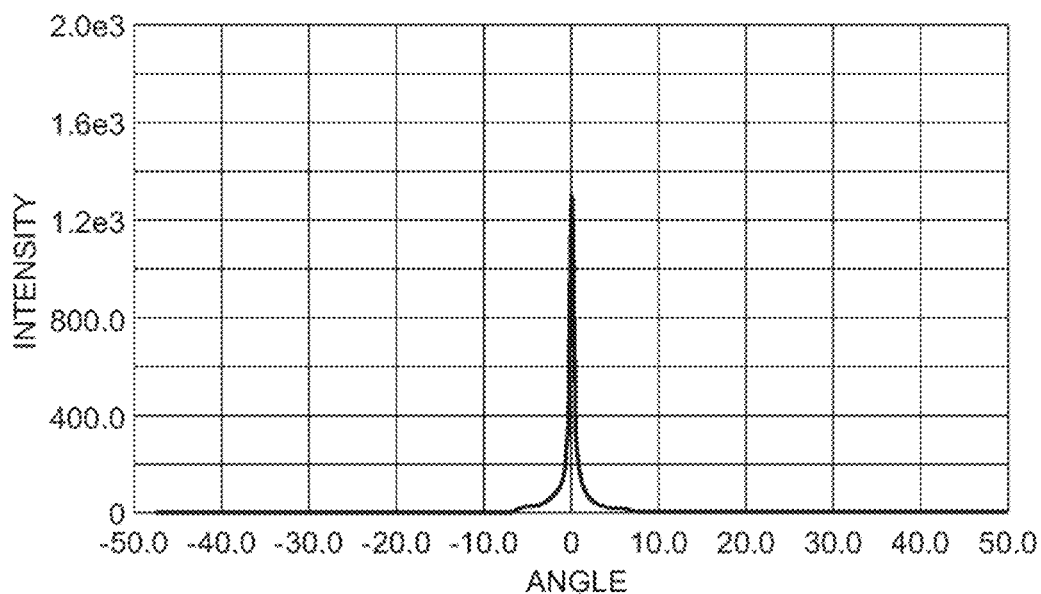
FIG. 27A shows a distribution of intensity of rays of light in the yz cross section, the rays having traveled in the direction perpendicular to the xy plane, entered and passed through the diffuser of Example 2.

FIG. 27A shows a distribution of intensity of rays of light in the yz cross section, the rays having traveled in the direction perpendicular to the xy plane, entered and passed through the diffuser of Example 2. The horizontal axis of FIG. 27A indicates angle of diffusion in the yz cross section, and the unit is degree. The vertical axis of FIG. 27A indicates intensity of rays of light in the yz cross section, and the unit is arbitrary one that shows relative values of intensity in Example 2.

Figure 27B:
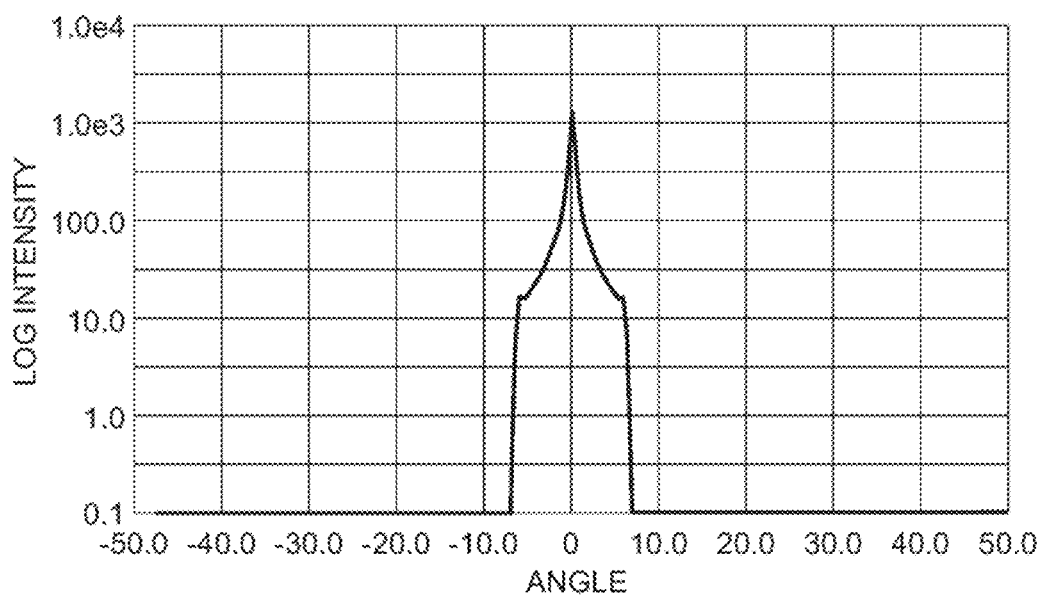
FIG. 27B shows a distribution of intensity of rays of light in the yz cross section, the rays having traveled in the direction perpendicular to the xy plane, entered and passed through the diffuser of Example 2.

FIG. 27B shows a distribution of intensity of rays of light in the yz cross section, the rays having traveled in the direction perpendicular to the xy plane, entered and passed through the diffuser of Example 2. The horizontal axis of FIG. 27B indicates angle of diffusion in the yz cross section, and the unit is degree. The vertical axis of FIG. 27B indicates intensity of rays of light in the yz cross section in a logarithmic scale, and the unit is arbitrary one that shows relative values of intensity in Example 2. According to FIG. 27B, the maximum and minimum values of angle of diffusion are ±7 degrees, and the shape showing the distribution of intensity has steeps around the values.

The reason why intensity of rays of light at angle of diffusion of 0 degree is greater in FIGS. 26A, 26B, 27A and 27B than in FIGS. 20 and 21 is that an area of surface that is parallel to the xy plane of the diffuser of Example 2 is larger than an area of surface that is parallel to the xy plane of the diffuser of Example 1.

Example 3

In Example 3, coefficients $A_i$ except $A_3$ of $h_1(x)$ are zero, and coefficients $B_i$ except $B_3$ of $h2_1(y)$ are zero. The functions $h_1(x)$ and $h2_1(y)$ are determined such that maximum and minimum values of angle of diffusion in the xz cross section are ±10 degrees and maximum and minimum values of angle of diffusion in the yz cross section are ±5 degrees, and the coefficients are determined as below.

$s=0.3, A_1=0, A_2=0, A_3=55$ $t=0.4, B_1=0, B_2=0, B_3=55$

Values of $A_i$ and $B_i$ are zero when i is 4 or greater.

The shape of the diffuser of Example 3 is a combination of convex shapes represented by g(x, y) and concave shapes represented by −g(x, y), and is represented by the following expression.

$$z = f(x, y) = \sum_{m,n} \left[ g(x - ms, y - nt) - g\left(x - \frac{2m+1}{2}s, y - \frac{2n+1}{2}t\right) \right] \quad (3)$$

Figure 28:
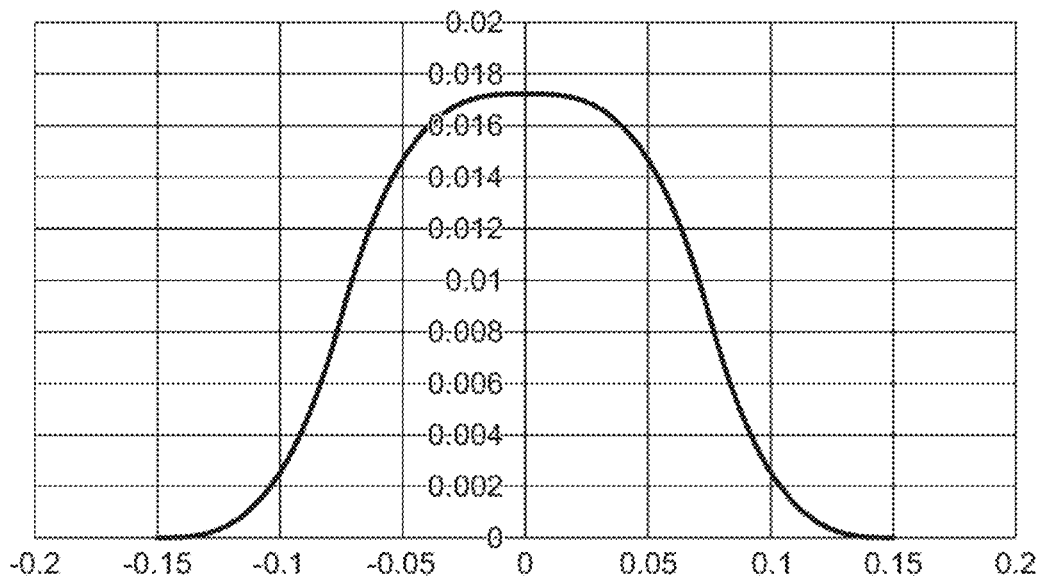
FIG. 28 shows the shape $h_1(x)$ of the diffuser of Example 3.

FIG. 28 shows the shape $h_1(x)$ of the diffuser of Example 3. FIG. 28 shows the xz cross section of the diffuser at y=0. The horizontal axis of FIG. 28 indicates x coordinate, and the unit is millimeter. The vertical axis of FIG. 28 indicates z coordinate, and the unit is millimeter.

Figure 29:
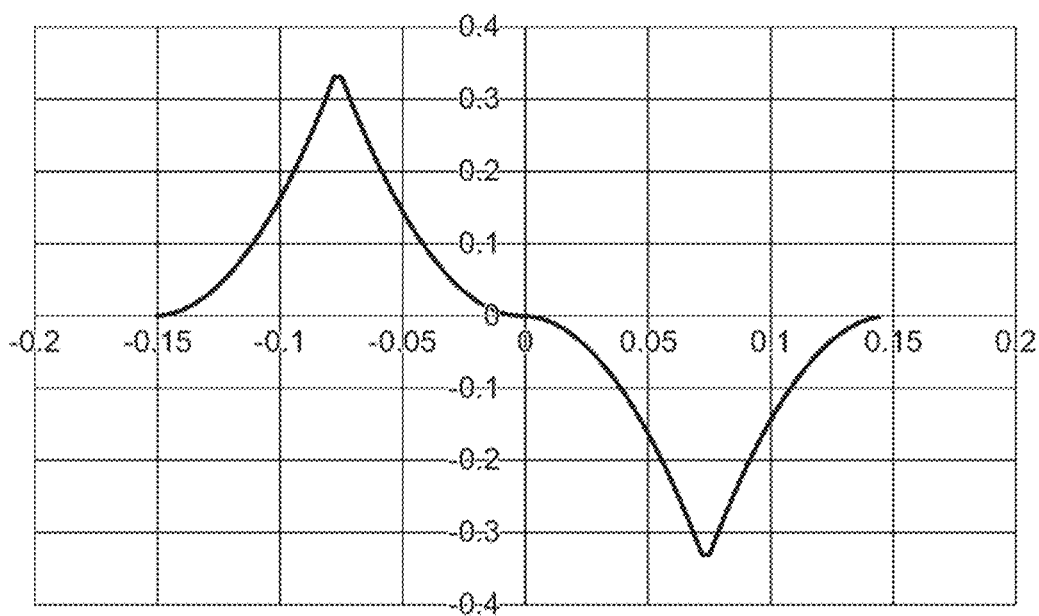
FIG. 29 shows first derivative of the function shown in FIG. 28.

FIG. 29 shows first derivative of the function shown in FIG. 28. The horizontal axis of FIG. 29 indicates x coordinate, and the unit is millimeter. The vertical axis of FIG. 29 indicates first derivative that has no units.

Figure 30:
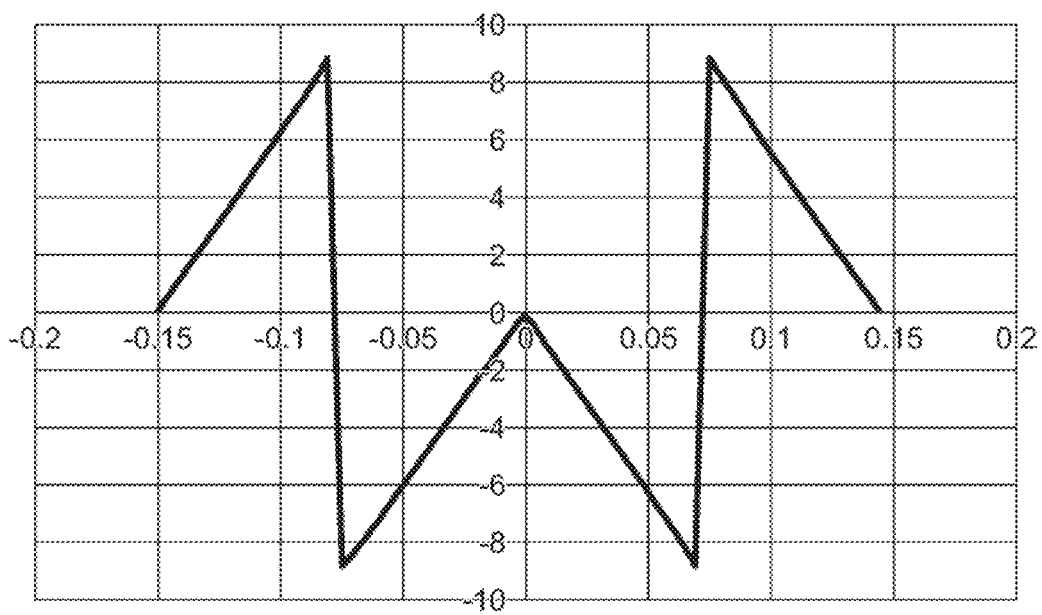
FIG. 30 shows second derivative of the function shown in FIG. 28.

FIG. 30 shows second derivative of the function shown in FIG. 28. The horizontal axis of FIG. 30 indicates x coordinate, and the unit is millimeter. The vertical axis of FIG. 30 indicates second derivative, and the unit is the inverse of millimeter.

Figure 31A:
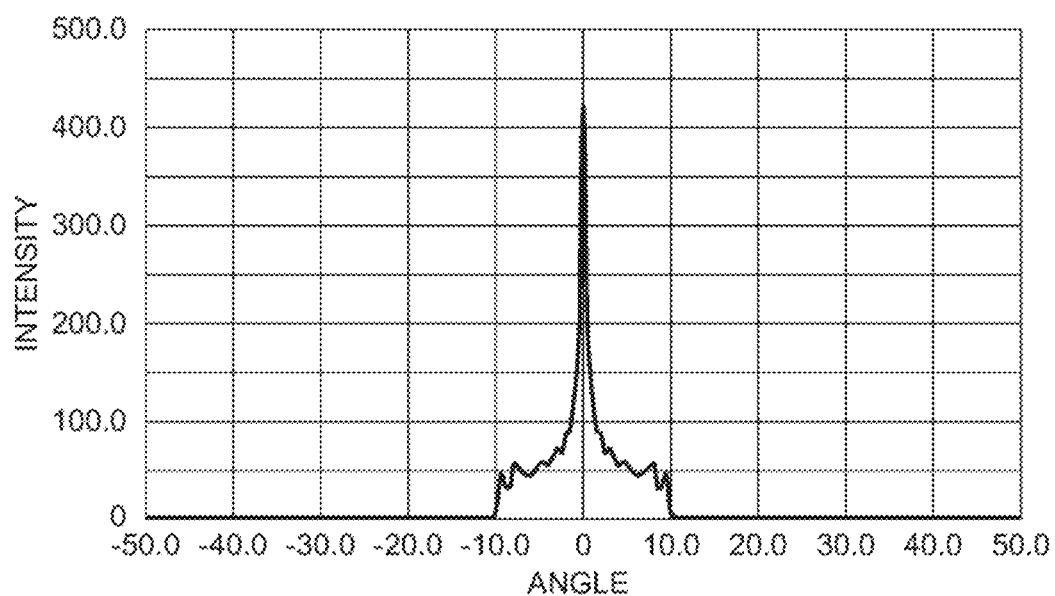
FIG. 31A shows a distribution of intensity of rays of light in the xz cross section, the rays having traveled in the direction perpendicular to the xy plane, entered and passed through the diffuser of Example 3.

FIG. 31A shows a distribution of intensity of rays of light in the xz cross section, the rays having traveled in the direction perpendicular to the xy plane, entered and passed through the diffuser of Example 3. The horizontal axis of FIG. 31A indicates angle of diffusion in the xz cross section, and the unit is degree. The vertical axis of FIG. 31A indicates intensity of rays of light in the xz cross section, and the unit is arbitrary one that shows relative values of intensity in Example 3.

Figure 31B:
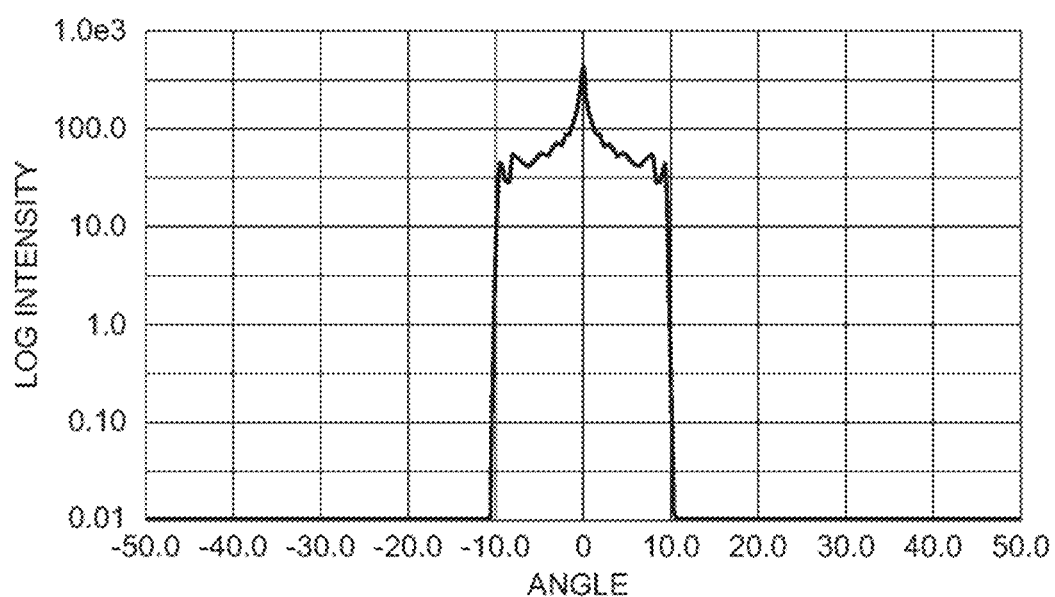
FIG. 31B shows a distribution of intensity of rays of light in the xz cross section, the rays having traveled in the direction perpendicular to the xy plane, entered and passed through the diffuser of Example 3.

FIG. 31B shows a distribution of intensity of rays of light in the xz cross section, the rays having traveled in the direction perpendicular to the xy plane, entered and passed through the diffuser of Example 3. The horizontal axis of FIG. 31B indicates angle of diffusion in the xz cross section, and the unit is degree. The vertical axis of FIG. 31B indicates intensity of rays of light in the xz cross section in a logarithmic scale, and the unit is arbitrary one that shows relative values of intensity in Example 3. According to FIG. 31B, the maximum and minimum values of angle of diffusion are ±10 degrees, and the shape showing the distribution of intensity has steeps around the values.

Figure 32A:
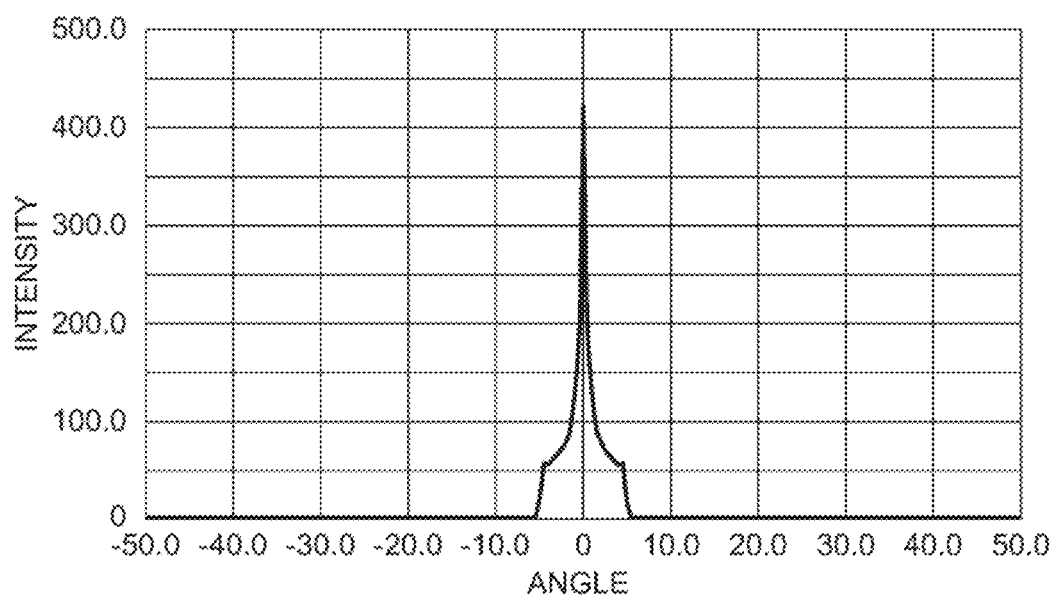
FIG. 32A shows a distribution of intensity of rays of light in the yz cross section, the rays having traveled in the direction perpendicular to the xy plane, entered and passed through the diffuser of Example 3.

FIG. 32A shows a distribution of intensity of rays of light in the yz cross section, the rays having traveled in the direction perpendicular to the xy plane, entered and passed through the diffuser of Example 3. The horizontal axis of FIG. 32A indicates angle of diffusion in the yz cross section, and the unit is degree. The vertical axis of FIG. 32A indicates intensity of rays of light in the yz cross section, and the unit is arbitrary one that shows relative values of intensity in Example 3.

Figure 32B:
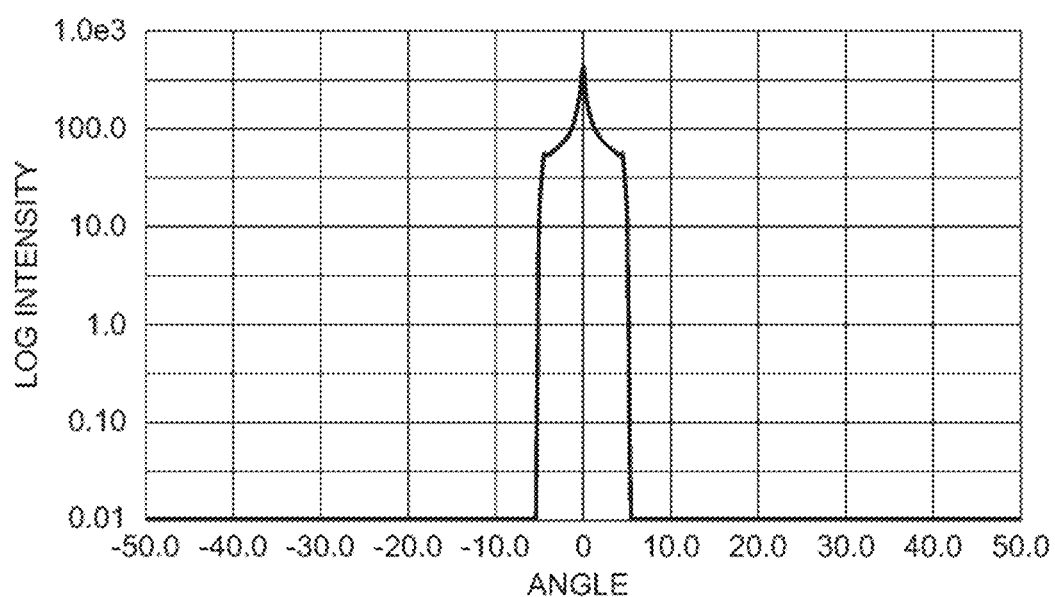
FIG. 32B shows a distribution of intensity of rays of light in the yz cross section, the rays having traveled in the direction perpendicular to the xy plane, entered and passed through the diffuser of Example 3.

FIG. 32B shows a distribution of intensity of rays of light in the yz cross section, the rays having traveled in the direction perpendicular to the xy plane, entered and passed through the diffuser of Example 3. The horizontal axis of FIG. 32B indicates angle of diffusion in the yz cross section, and the unit is degree. The vertical axis of FIG. 32B indicates intensity of rays of light in the yz cross section in a logarithmic scale, and the unit is arbitrary one that shows relative values of intensity in Example 3. According to FIG. 32B, the maximum and minimum values of angle of diffusion are ±5 degrees, and the shape showing the distribution of intensity has steeps around the values.

Example 4

In Example 4, coefficients $A_i$ except $A_2$ and $A_4$ of $h_1(x)$ are zero, and coefficients $B_i$ except $B_2$ and $B_4$ of $h2_1(y)$ are zero. The functions $h_1(x)$ and $h2_1(y)$ are determined such that maximum and minimum values of angle of diffusion in the xz cross section are ±20 degrees and maximum and minimum values of angle of diffusion in the yz cross section are ±10 degrees, and the coefficients are determined as below.

$s=0.6, A_1=0, A_2=-3.6, A_3=0, A_4=-0.5$ $t=1.2, B_1=0, B_2=-3.6, B_3=0, B_4=-0.5$

Values of $A_i$ and $B_i$ are zero when i is 5 or greater.

The shape of the diffuser of Example 4 is a combination of a convex shape represented by g(x, y) and a concave shape represented by −g(x, y), and is represented by the following expression.

$$z = f(x, y) = \sum_{m,n} \left[ g(x - ms, y - nt) - g\left(x - \frac{2m+1}{2}s, y - \frac{2n+1}{2}t\right) \right] \quad (3)$$

Figure 33:
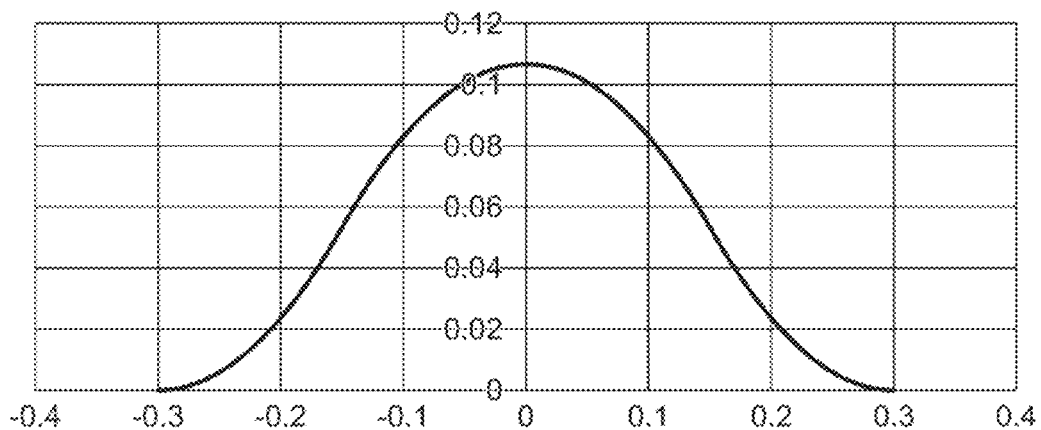
FIG. 33 shows the shape $h_1(x)$ of the diffuser of Example 4.

FIG. 33 shows the shape $h_1(x)$ of the diffuser of Example 4. FIG. 33 shows the xz cross section of the diffuser at y=0. The horizontal axis of FIG. 33 indicates x coordinate, and the unit is millimeter. The vertical axis of FIG. 33 indicates z coordinate, and the unit is millimeter.

Figure 34:
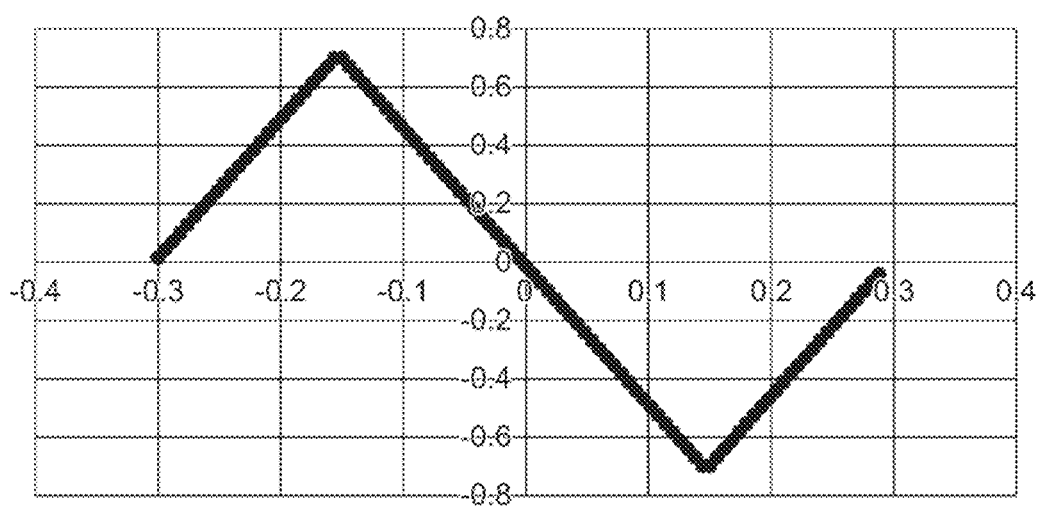
FIG. 34 shows first derivative of the function shown in FIG. 33.

FIG. 34 shows first derivative of the function shown in FIG. 33. The horizontal axis of FIG. 34 indicates x coordinate, and the unit is millimeter. The vertical axis of FIG. 34 indicates first derivative that has no units. From FIG. 34, the maximum value of the absolute value of first derivative $\left|\frac{df}{dx}\right|$ is 0.7.

Figure 35:
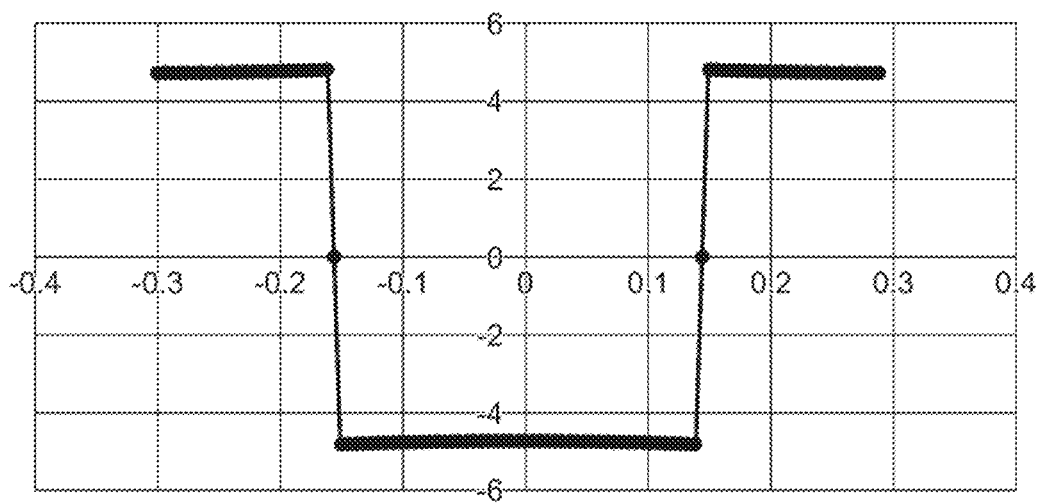
FIG. 35 shows second derivative of the function shown in FIG. 33.

FIG. 35 shows second derivative of the function shown in FIG. 33. The horizontal axis of FIG. 35 indicates x coordinate, and the unit is millimeter. The vertical axis of FIG. 35 indicates second derivative, and the unit is the inverse of millimeter.

Figure 36:
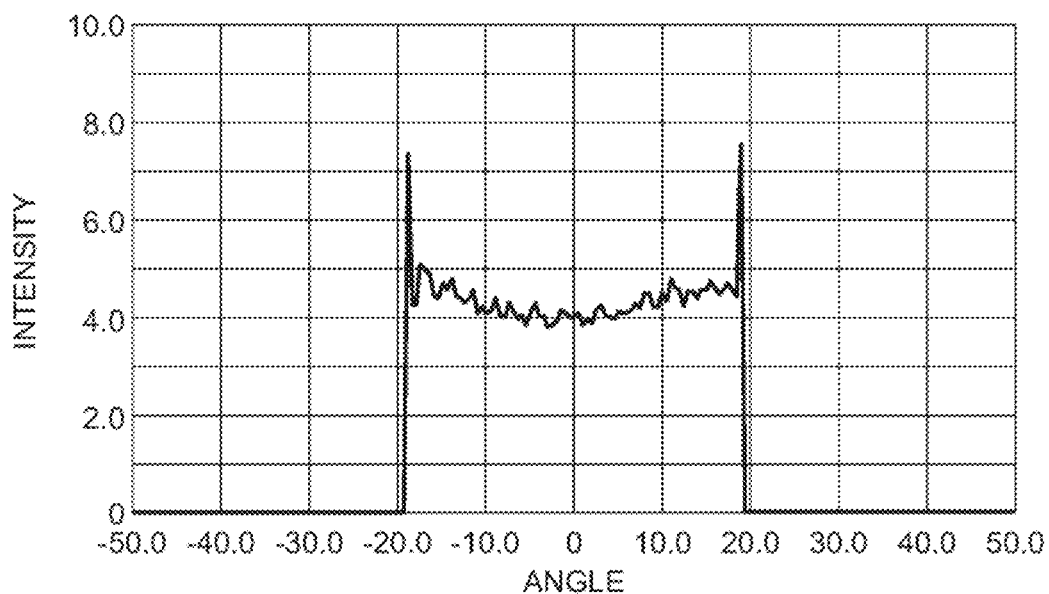
FIG. 36 shows a distribution of intensity of rays of light in the xz cross section, the rays having traveled in the direction perpendicular to the xy plane, entered and passed through the diffuser of Example 4.

FIG. 36 shows a distribution of intensity of rays of light in the xz cross section, the rays having traveled in the direction perpendicular to the xy plane, entered and passed through the diffuser of Example 4. The horizontal axis of FIG. 36 indicates angle of diffusion in the xz cross section, and the unit is degree. The vertical axis of FIG. 36 indicates intensity of rays of light in the xz cross section, and the unit is arbitrary one that shows relative values of intensity in Example 4. According to FIG. 36, the maximum and minimum values of angle of diffusion are ±19 degrees, and the shape showing the distribution of intensity has steeps around the values.

Figure 37:
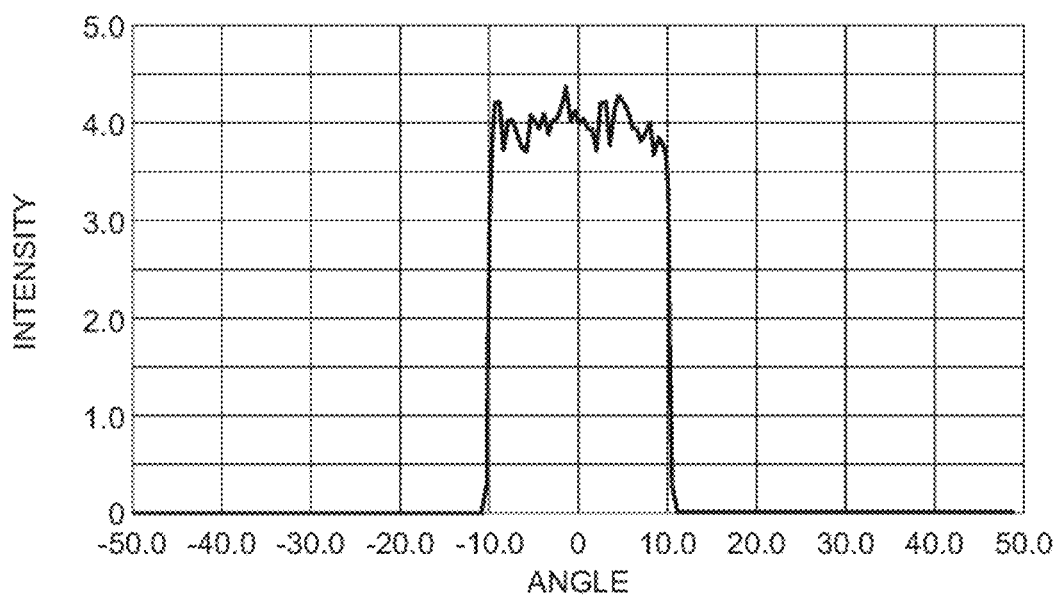
FIG. 37 shows a distribution of intensity of rays of light in the yz cross section, the rays having traveled in the direction perpendicular to the xy plane, entered and passed through the diffuser of Example 4.

FIG. 37 shows a distribution of intensity of rays of light in the yz cross section, the rays having traveled in the direction perpendicular to the xy plane, entered and passed through the diffuser of Example 4. The horizontal axis of FIG. 37 indicates angle of diffusion in the yz cross section, and the unit is degree. The vertical axis of FIG. 37 indicates intensity of rays of light in the yz cross section, and the unit is arbitrary one that shows relative values of intensity in Example 4. According to FIG. 37, the maximum and minimum values of angle of diffusion are ±10 degrees, and the shape showing the distribution of intensity has steeps around the values.

Figure 38:
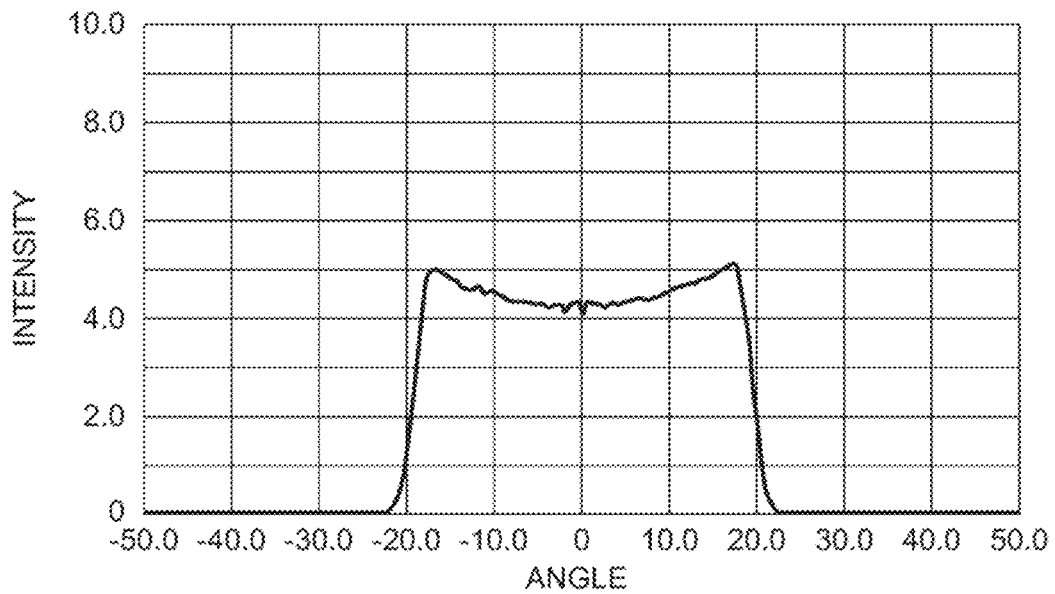
FIG. 38 shows a distribution of intensity of rays of light in the xz cross section, the rays having traveled in the direction perpendicular to the xy plane, entered and passed through a diffuser of a variant of Example 4.

FIG. 38 shows a distribution of intensity of rays of light in the xz cross section, the rays having traveled in the direction perpendicular to the xy plane, entered and passed through a diffuser of a variant of Example 4. The diffuser of the variant of Example 4 has been obtained by irregularly changing positions of the vertexes of the rectangles and height of the concave and convex shapes in the way described above. The horizontal axis of FIG. 38 indicates angle of diffusion in the xz cross section, and the unit is degree. The vertical axis of FIG. 38 indicates intensity of rays of light in the xz cross section, and the unit is arbitrary one that shows relative values of intensity in the variant of Example 4.

Figure 39:
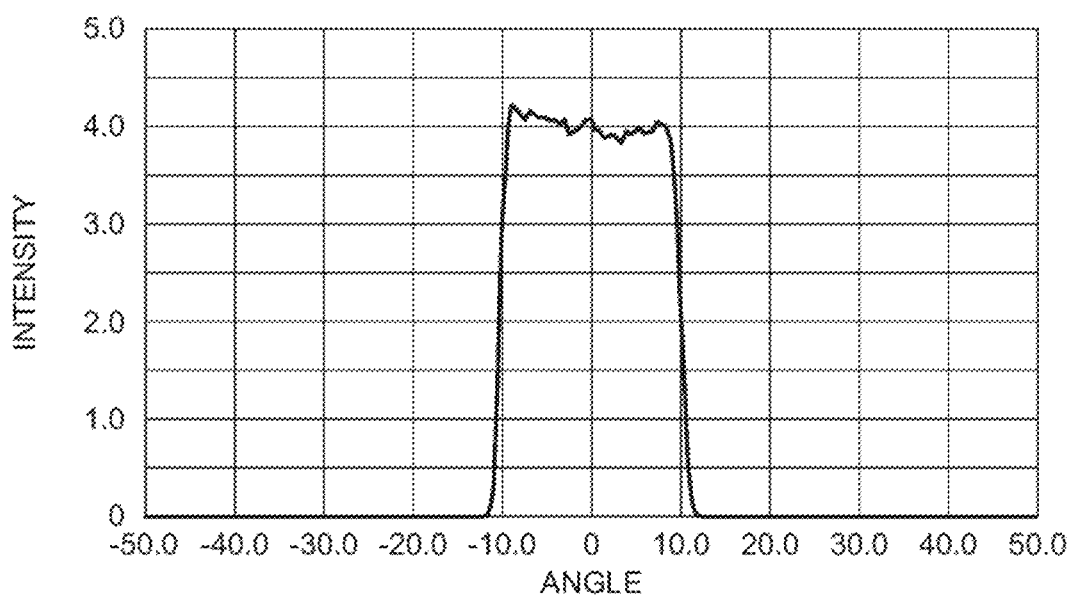
FIG. 39 shows a distribution of intensity of rays of light in the yz cross section, the rays having traveled in the direction perpendicular to the xy plane, entered and passed through the diffuser of Example 4.

FIG. 39 shows a distribution of intensity of rays of light in the yz cross section, the rays having traveled in the direction perpendicular to the xy plane, entered and passed through the diffuser of the variant of Example 4. The horizontal axis of FIG. 39 indicates angle of diffusion in the yz cross section, and the unit is degree. The vertical axis of FIG. 39 indicates intensity of rays of light in the yz cross section, and the unit is arbitrary one that shows relative values of intensity in the variant of Example 4.

According to FIGS. 36 to 39, intensity of rays diffused by the diffusers of Example 4 and the variant of Example 4 is zero when the absolute value of angle of diffusion is greater than the maximum value of angle of diffusion and is substantially equal to a predetermined value when the absolute value of angle of diffusion is equal to or less than the maximum value of angle of diffusion, and thus the shapes of the distribution of intensity are nearly ideal. When FIGS. 38-39 are compared with FIGS. 36-37, the illuminance distributions shown in FIG. FIGS. 38-39 are more uniform than the illuminance distributions shown in FIG. FIGS. 36-37.

Characteristics of the Shapes of the Diffusers of Examples 1-4

According to FIGS. 17, 23, 28 and 33, the shapes of $h_1(x)$ of Examples 1-4 are smooth and symmetric with respect to the x axis. At $x=0$ $h_1(x)$ has the maximum value.

According to FIGS. 18, 24, 29 and 34, the absolute value of first derivative of $h_1(x)$ is zero at $x=0$ where $h_1(x)$ has the maximum value, and increases with the absolute value of x, reaches the maximum value and then decreases with the absolute value of x down to zero. The absolute value of first derivative is equal to the absolute value of the tangent of the tangential angle, and the maximum value of the absolute value of angle of diffusion is determined by the maximum value of the absolute value of first derivative.

According to FIGS. 19, 25, 30 and 35, second derivative of $h_1(x)$ of Examples 1-4 in the area where the absolute value of x is smaller than the absolute value of x at which the absolute value of first derivative of $h_1(x)$ has the maximum value is negative or zero. Second derivative of $h_1(x)$ of Examples 1-4 in the area where the absolute value of x is greater than the absolute value of x at which the absolute value of first derivative of $h_1(x)$ has the maximum value is positive or zero. Second derivative of $h_1(x)$ of Examples 1-4 is discontinuous at the absolute value of x at which the absolute value of first derivative of $h_1(x)$ has the maximum value.

The absolute value of angle of diffusion θ changes depending on the tangential angle, the absolute value of first derivative is equal to the absolute value of the tangent of the tangential angle, and the maximum value of the absolute value of angle of diffusion is determined by the maximum value of the absolute value of first derivative. Further, second derivative of $h_1(x)$ is discontinuous at the absolute value of x at which the absolute value of first derivative of $h_1(x)$ has the maximum value, and the sign of second derivative of $h_1(x)$ changes at the absolute value of x at which the absolute value of first derivative of $h_1(x)$ has the maximum value. This means that when angle of diffusion is plotted against x, angle of diffusion changes steeply around the absolute value of x at which angle of diffusion reaches the maximum value. As a result, the shape of a distribution of intensity of light in the xz cross section plotted against angle of diffusion has steeps around the maximum value of the absolute value of angle of diffusion. Thus, nearly ideal diffusers with which intensity of light in the xz cross section is substantially uniform when the absolute value of angle of diffusion is equal to or less than the maximum value of angle of diffusion, and intensity of light in the xz cross section is zero when he absolute value of angle of diffusion is greater than the maximum value of angle of diffusion can be obtained.

The functions $h_2(y)$ of Examples 1-4 have shapes similar to the shapes of functions $h_1(x)$. In other words, the shapes of $h_2(y)$ of Examples 1-4 are smooth and symmetric with respect to the y axis. At $y=0$ $h_2(y)$ has the maximum value. The absolute value of first derivative of $h_2(y)$ is zero at $y=0$ where $h_2(y)$ has the maximum value, and increases with the absolute value of y, reaches the maximum value and then decreases with the absolute value of y down to zero. Second derivative of $h_2(y)$ of Examples 1-4 in the area where the absolute value of y is smaller than the absolute value of y at which the absolute value of first derivative of $h_2(y)$ has the maximum value is negative or zero. Second derivative of $h_2(y)$ of Examples 1-4 in the area where the absolute value of y is greater than the absolute value of y at which the absolute value of first derivative of $h_2(y)$ has the maximum value is positive or zero. Second derivative of $h_2(y)$ of Examples 1-4 is discontinuous at the absolute value of y at which the absolute value of first derivative of $h_2(y)$ has the maximum value. Accordingly, the diffusers are nearly ideal in that with them intensity of light in the yz cross section is substantially uniform when the absolute value of angle of diffusion is equal to or less than the maximum value of angle of diffusion, and intensity of light in the yz cross section is zero when he absolute value of angle of diffusion is greater than the maximum value of angle of diffusion.

Examples 1-4 are characterized by the shapes of $h_1(x)$ and $h_2(x)$. In other words, the function $$g(x,y)=h_1(x) \cdot h_2(y)$$

has characteristic shapes. In Examples 1-4, shapes represented by at least one of $g(x, y)$ and $-g(x, y)$ are arranged on the xy plane such that the whole shape represented by $z=f(x, y)$ is represented by Expression (3) or Expression (4). In general, diffusers can be configured with plural shapes obtained by translation on an xy plane of at least one of $z=g(x, y)$ and $z=-g(x, y)$. By arranging the plural shapes described above such that the ratio of the flat area on the xy plane to the projected area onto the xy plane of a diffuser is less than a predetermined value a nearly ideal diffuser can be obtained. The predetermined value is 1.0%.

What is claimed is:

1. A diffuser provided with plural shapes obtained by translation on an xy plane of at least one of $z=g(x, y)$ and $z=-g(x, y)$, $z=g(x, y)$ being a smooth function within a rectangle on the xy plane, the rectangle having sides in the x axis direction length of which is s and sides in the y axis direction length of which is t, the origin of the xy coordinates being the center of the rectangle,
wherein on the sides of the rectangle, $$g(x, y) = 0,$$
$$\frac{\partial g(x, y)}{\partial x} = 0,$$
$$\frac{\partial g(x, y)}{\partial y} = 0,$$
$$\frac{\partial^2 g(x, y)}{\partial x^2} = 0, \text{ and}$$
$$\frac{\partial^2 g(x, y)}{\partial y^2}$$

and
wherein the shape represented by $z=g(x, y)$ has a single vertex at $$(x_v, y_v)$$

in the rectangle, z monotonously increases from a point on a side of the rectangle to the vertex along a straight line connecting the point and the vertex, $g(x, y)$ is represented by $$g(x,y)=h_1(x) \cdot h_2(y),$$

first derivative of $$z=h_1(x)$$

is continuous in $$-\frac{s}{2} \le x \le \frac{s}{2}$$

equal to zero at the x coordinate of the vertex, positive in the range where x coordinate is smaller than the x coordinate of the vertex and greater than $$-\frac{s}{2}$$

and negative in the range where x coordinate is greater than the x coordinate of the vertex and smaller than $$\frac{s}{2}$$

the first derivative has a maximum value in the range where x coordinate is smaller than the x coordinate of the vertex and a minimum value in the range where x coordinate is greater than the x coordinate of the vertex, second derivative of $$z=h_1(x)$$

has a single point of discontinuity respectively at the x coordinate where the first derivative has the maximum value and at the x coordinate where the first derivative has the minimum value, first derivative of $$z=h_2(y)$$

is continuous in $$-\frac{t}{2} \le y \le \frac{t}{2}$$

equal to zero at the y coordinate of the vertex, positive in the range where y coordinate is smaller than the y coordinate of the vertex and greater than $$-\frac{t}{2}$$

and negative in the range where y coordinate is greater than the y coordinate of the vertex, the first derivative has a maximum value in the range where y coordinate is smaller than the y coordinate of the vertex and a minimum value in the range where y coordinate is greater than the y coordinate of the vertex and smaller than $$\frac{t}{2}$$

and second derivative of $$z=h_2(y)$$

has a single point of discontinuity respectively at the x coordinate where the first derivative has the maximum value and at the x coordinate where the first derivative has the minimum value, and
wherein when in an xz cross section an angle between an outgoing ray of light and the z axis is defined as an absolute value of angle of diffusion in the xz cross section and in an yz cross section an angle between an outgoing ray of light and the z axis is defined as an absolute value of angle of diffusion in the yz cross section, at least one of the absolute values of the maximum value and the minimum value of the first derivative of $$z=h_1(x)$$

is determined such that the maximum absolute value of angle of diffusion in the xz cross section is set to a desired value and at least one of the absolute values of the maximum value and the minimum value of the first derivative of $$z=h_2(y)$$

is determined such that the maximum absolute value of angle of diffusion in the yz cross section is set to a desired value.

2. The diffuser according to claim 1 wherein the shape is represented by $$z = f(x, y) = \sum_{m,n} [g(x - ms, y - nt)]$$

where m is a number representing a position of each rectangle in the x axis direction, n is a number representing a position of each rectangle in the y axis direction, and the origin is the center of the rectangle numbered with m=0 and n=0.

3. The diffuser according to claim 1 wherein the shape is represented by $$z = f(x, y) = \sum_{m,n} \left[ g(x - ms, y - nt) - g\left(x - \frac{2m+1}{2}s, y - \frac{2n+1}{2}t\right) \right]$$

where m is a number representing a position of each rectangle in the x axis direction, n is a number representing a position of each rectangle in the y axis direction, and the origin is the center of the rectangle numbered with m=0 and n=0.

4. The diffuser according to claim 1 wherein $$h_1(x)$$

is a polynomial of second or more degree represented by $$h_1(x) = \begin{cases} 0, & x \notin \left(-\frac{s}{2}, \frac{s}{2}\right) \\ \sum_{i=1}^{N} A_i \left(x + \frac{s}{2}\right)^i, & x \in \left(-\frac{s}{2}, -\frac{s}{4}\right) \\ \sum_{i=1}^{N} A_i \left(-(-1)^i x^i + 2\left(\frac{s}{4}\right)^i\right), & x \in \left[-\frac{s}{4}, 0\right] \\ \sum_{i=1}^{N} A_i \left(-x^i + 2\left(\frac{s}{4}\right)^i\right), & x \in \left(0, \frac{s}{4}\right] \\ \sum_{i=1}^{N} A_i (-1)^i \left(x - \frac{s}{2}\right)^i, & x \in \left(\frac{s}{4}, \frac{s}{2}\right) \end{cases}$$

and $$h_2(y)$$

is a polynomial of second or more degree represented by $$h_1(x) = \begin{cases} 0, & y \notin \left(-\frac{t}{2}, \frac{t}{2}\right) \\ \sum_{j=1}^{M} B_j \left(y + \frac{t}{2}\right)^j, & y \in \left(-\frac{t}{2}, -\frac{t}{4}\right) \\ \sum_{j=1}^{M} B_j \left(-(-1)^j y^j + 2\left(\frac{t}{4}\right)^j\right), & y \in \left[-\frac{t}{4}, 0\right] \\ \sum_{j=1}^{M} B_j \left(-y^j + 2\left(\frac{t}{4}\right)^j\right), & y \in \left(0, \frac{t}{4}\right] \\ \sum_{j=1}^{M} B_j (-1)^j \left(y - \frac{t}{2}\right)^j, & y \in \left(\frac{t}{4}, \frac{t}{2}\right) \end{cases}$$

where i and j represent natural numbers, N and M represents natural numbers that are 2 or more, and Ai and Bj represent constants.

5. The diffuser according to claim 4 wherein $$h_1(x)$$

and $$h_2(y)$$

are even degree polynomials.

6. The diffuser according to claim 1 wherein the ratio of the flat area on the xy plane to the whole area of the xy plane occupied by the diffuser is less than 1.0%.

7. The diffuser according to claim 1 wherein each vertex of each rectangle is moved at random in a predetermined area around the each vertex on the xy plane such that a convex tetragon is formed by moved vertexes, and a shape of the diffuser represented by z=f(x,y) is determined such that z at a first point in the convex tetragon has a value of z=f(x, y) at a second point in the original rectangle, the second point corresponding to the first point.

8. The diffuser according to claim 1 wherein a z coordinate in each rectangle is determined such that the z coordinate is γ times as great as the value of z=f (x, y) in the each rectangle, γ varying at random in the range from 0.9 to 1.1 from a rectangle to another.

9. The diffuser having shapes on a curved surface, wherein the shapes are configured by a projection of the shapes on the xy plane of the diffuser according to claim 1, the projection projecting the xy plane onto the curved surface.

10. A method of manufacturing a diffuser provided with plural shapes obtained by translation on an xy plane of at least one of z=g(x, y) and z=-g(x, y), z=g(x, y) being a smooth function within a rectangle on the xy plane, the rectangle having sides in the x axis direction length of which is s and sides in the y axis direction length of which is t, the origin of the xy coordinates being the center of the rectangle, wherein when in an xz cross section an angle between an outgoing ray of light and the z axis is defined as an absolute value of angle of diffusion in the xz cross section and in an yz cross section an angle between an outgoing ray of light and the z axis is defined as an absolute value of angle of diffusion in the yz cross section, the shape of the diffuser is determined such that the maximum absolute value of angle of diffusion in the xz cross section is set to a first desired value and the maximum absolute value of angle of diffusion in the yz cross section is set to a second desired value, the method comprising the steps of:

determining a function z=g(x, y) wherein on the sides of the rectangle, $$g(x,y)=0$$

$$\frac{\partial g(x, y)}{\partial x} = 0, \frac{\partial g(x, y)}{\partial y} = 0, \frac{\partial^2 g(x, y)}{\partial x^2} = 0, \text{ and } \frac{\partial^2 g(x, y)}{\partial y^2} = 0$$

and
wherein the shape represented by z=g(x, y) has a single vertex in the rectangle, z monotonously increases from a point on a side of the rectangle to the vertex along a straight line connecting the point and the vertex, g(x, y) is represented by $$g(x,y)=h_1(x)\cdot h_2(y),$$

first derivative of $$z=h_1(x)$$

is continuous in $$-\frac{s}{2} \le x \le \frac{s}{2}$$

equal to zero at the x coordinate of the vertex, positive in the range where x coordinate is smaller than the x coordinate of the vertex and greater than $$-\frac{s}{2}$$

and negative in the range where x coordinate is greater than the x coordinate of the vertex and smaller than $$\frac{s}{2}$$

the first derivative has a maximum value in the range where x coordinate is smaller than the x coordinate of the vertex and a minimum value in the range where x coordinate is greater than the x coordinate of the vertex, second derivative of $$z=h_1(x)$$

has a single point of discontinuity respectively at the x coordinate where the first derivative has the maximum value and at the x coordinate where the first derivative has the minimum value, first derivative of $$z=h_2(y)$$

is continuous in $$-\frac{t}{2} \le y \le \frac{t}{2}$$

equal to zero at the y coordinate of the vertex, positive in the range where y coordinate is smaller than the y coordinate of the vertex and greater than $$-\frac{t}{2}$$

and negative in the range where y coordinate is greater than the y coordinate of the vertex, the first derivative has a maximum value in the range where y coordinate is smaller than the y coordinate of the vertex and a minimum value in the range where y coordinate is greater than the y coordinate of the vertex and smaller than $$\frac{t}{2}$$

and second derivative of $$z=h_2(y)$$

has a single point of discontinuity respectively at the x coordinate where the first derivative has the maximum value and at the x coordinate where the first derivative has the minimum value;
adjusting coefficients of $$z=h_1(x)$$

and $$z=h_2(y)$$

such that at least one of the absolute values of the maximum value and the minimum value of the first derivative of $$z=h_1(x)$$

is determined such that the maximum absolute value of angle of diffusion in the xz cross section is set to the first desired value and at least one of the absolute values of the maximum value and the minimum value of the first derivative of $$z=h_2(y)$$

is determined such that the maximum absolute value of angle of diffusion in the yz cross section is set to the second desired value; and
arranging the plural shapes by translation on the xy plane of at least one of z=g(x, y) and z=−g(x, y).

11. The method of manufacturing a diffuser according to claim 10, wherein $$h_1(x)$$

is a polynomial of second or more degree represented by $$h_1(x) = \begin{cases} 0, & x \notin \left(-\frac{s}{2}, \frac{s}{2}\right) \\ \sum_{i=1}^{N} A_i\left(x+\frac{s}{2}\right)^i, & x \in \left(-\frac{s}{2}, -\frac{s}{4}\right) \\ \sum_{i=1}^{N} A_i\left(-(-1)^i x^i + 2\left(\frac{s}{4}\right)^i\right), & x \in \left[-\frac{s}{4}, 0\right] \\ \sum_{i=1}^{N} A_i\left(-x^i + 2\left(\frac{s}{4}\right)^i\right), & x \in \left(0, \frac{s}{4}\right] \\ \sum_{i=1}^{N} A_i(-1)^i\left(x-\frac{s}{2}\right)^i, & x \in \left(\frac{s}{4}, \frac{s}{2}\right) \end{cases}$$

, and $h_2(y)$ is a polynomial of second or more degree represented by $$h_2(y) = \begin{cases} 0, & y \notin \left(-\frac{t}{2}, \frac{t}{2}\right) \\ \sum_{j=1}^{M} B_j \left(y + \frac{t}{2}\right)^j, & y \in \left(-\frac{t}{2}, -\frac{t}{4}\right) \\ \sum_{j=1}^{M} B_j \left(-(-1)^j y^j + 2\left(\frac{t}{4}\right)^j\right), & y \in \left[-\frac{t}{4}, 0\right] \\ \sum_{j=1}^{M} B_j \left(-y^j + 2\left(\frac{t}{4}\right)^j\right), & y \in \left(0, \frac{t}{4}\right] \\ \sum_{j=1}^{M} B_j (-1)^j \left(y - \frac{t}{2}\right)^j, & y \in \left(\frac{t}{4}, \frac{t}{2}\right) \end{cases}$$

where i and j represent natural numbers, N and M represents natural numbers that are 2 or more, and Ai and Bj represent constants.

* * * * *